United States Patent
Mizoshita et al.

(10) Patent No.: US 11,322,339 B2
(45) Date of Patent: May 3, 2022

(54) SAMPLE PLATE FOR LASER DESORPTION/IONIZATION MASS SPECTROMETRY

(71) Applicant: KABUSHIKI KAISHA TOYOTA CHUO KENKYUSHO, Nagakute (JP)

(72) Inventors: Norihiro Mizoshita, Nagakute (JP); Masakazu Murase, Nagakute (JP); Yuri Sasaki, Nagakute (JP); Yasutomo Goto, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 240 days.

(21) Appl. No.: 16/689,409

(22) Filed: Nov. 20, 2019

(65) Prior Publication Data

US 2020/0273690 A1   Aug. 27, 2020

(30) Foreign Application Priority Data

Feb. 21, 2019   (JP) .............................. JP2019-029614

(51) Int. Cl.
| | | |
|---|---|---|
| *H01J 49/04* | (2006.01) | |
| *H01J 49/16* | (2006.01) | |
| *B32B 33/00* | (2006.01) | |
| *B32B 3/26* | (2006.01) | |
| *B82Y 30/00* | (2011.01) | |

(52) U.S. Cl.
CPC ............ *H01J 49/0418* (2013.01); *B32B 3/26* (2013.01); *B32B 33/00* (2013.01); *H01J 49/164* (2013.01); *B32B 2264/102* (2013.01); *B32B 2307/728* (2013.01); *B32B 2307/73* (2013.01); *B82Y 30/00* (2013.01)

(58) Field of Classification Search
CPC ..... B32B 3/26; B32B 33/00; B32B 2264/102; B32B 2307/728; B32B 2307/73; B82Y 30/00; H01J 49/0418; H01J 49/164
See application file for complete search history.

(56) References Cited

U.S. PATENT DOCUMENTS

| | | |
|---|---|---|
| 6,287,872 B1 | 9/2001 | Schurenberg et al. |
| 7,619,215 B2 | 11/2009 | Kim |
| 2008/0073618 A1 | 3/2008 | Inagaki et al. |

FOREIGN PATENT DOCUMENTS

| | | |
|---|---|---|
| JP | 2008-84836 A | 4/2008 |
| JP | 2016-95498 A | 5/2016 |

OTHER PUBLICATIONS

Goto et al., "Meso. org. films for laser des./ion. mass spectrometry", Apr. 10, 2018, Elsevier (Microporous and Mesoporous Materials), Issue 268, pp. 125-130 (Year: 2018).*

(Continued)

*Primary Examiner* — Travis M Figg
*Assistant Examiner* — Ethan Weydemeyer
(74) *Attorney, Agent, or Firm* — Oliff PLC

(57) ABSTRACT

The present invention provides a sample plate for laser desorption/ionization mass spectrometry, comprising: a hydrophilic thin film capable of absorbing a laser ray; and a water-repellent thin film comprising surface-hydrophobized nanoparticles and being stacked in a region other than a region to be a sample spot on a surface of the hydrophilic thin film, wherein a water contact angle of the water-repellent thin film is 120° or more.

12 Claims, 14 Drawing Sheets

(56) References Cited

OTHER PUBLICATIONS

Dupre et al, "Invest, of Sil,_based Nano. Morph, and Chem. Term, on Laser Des. Ion. Mass Spect. Performance", Nov. 19, 2012, ACS (analytical chemistry), vol. 84, pp. 10637-10644 (Year: 2012).*
Teng, Fei et al. "Enhancing reproducibility of SALDI MS detection by concentrating analytes within laser spot". Elsevier, Talanta, vol. 179, pp. 583-587, 2018.

* cited by examiner

SAMPLE PLATE FOR LASER DESORPTION/IONIZATION MASS SPECTROMETRY

BACKGROUND OF THE INVENTION

Field of the Invention

The present invention relates to a sample plate for laser desorption/ionization mass spectrometry.

Related Background Art

Mass spectrometry (MS) is an analysis method which includes ionizing a sample containing measurement target molecules, and separating and detecting the ions derived from the measurement target molecules based on the mass-to-charge ratio (mass/charge (m/z)), to thereby obtain information on the chemical structure of the measurement target molecules. In mass spectrometry (MS) as described above, ionization of the sample is an important process which affects the success or failure of analysis and the quality of the spectrum obtained, and examples of known methods thereof (ionization methods) include laser desorption/ionization (LDI). Moreover, in mass spectrometry employing laser desorption/ionization (LDI), studies of various types of sample plates for use in such ionization methods have been in progress in recent years for the purpose of further improving the accuracy of the analysis.

For example, U.S. Pat. No. 6,287,872 (Patent Document 1) discloses a sample plate including a plurality of anchor sites (hydrophilic anchors) which are surrounded by a hydrophobic area (hydrophobic membrane) or the like and which are more hydrophilic than the hydrophobic area. Note that Patent Document 1 discloses that a thin film such as Teflon (registered trademark) is adhered to a metal support plate or a metallized plastic to form a hydrophobic surface (hydrophobic area), that a dense layer of alkane chains is formed on the surface of a metal support plate or the like to form a hydrophobic surface, and further that an end of such an alkane can be substituted with a fluorine atom to achieve higher hydrophobicity, and the like. In addition, Patent Document 1 discloses that such a sample plate is used by coating sample droplets on a hydrophilic anchor portion.

In addition, U.S. Pat. No. 7,619,215 (Patent Document 2) discloses a sample plate including a stainless steel substrate and a mono-layered hydrophobic organosilane formed on a stainless steel surface and having an opening to expose the stainless steel surface, wherein a sampling spot (sampling area) includes an exposed hydrophilic stainless steel surface. As the organosilane, Example 1 of the patent document describes use of a perfluorotrichlorosilane copolymer solution or a fluorocarbon solution manufactured by the 3M Company (trade name of FC-3283).

Moreover, the paper by F. Teng et al. "Enhancing reproducibility of SALDI MS detection by concentrating analytes within laser spot (Non Patent Document 1)" described in pp. 583-587 of Talanta (Vol. 179) issued in 2018 discloses a sample plate of hydrophobic nanocone arrays with hydrophilic spots, which is produced by treating the surface of silicon nanocone arrays with trichloro(1H,1H,2H,2H-perfluorooctyl)silane to form a hydrophobic surface, and then performing photolithography and oxygen plasma treatment to from partially hydrophilic spots.

SUMMARY OF THE INVENTION

However, conventional sample plates as described in Patent Documents 1 and 2 described above are a plate for so-called matrix-assisted laser desorption/ionization (MALDI), and must use, for the measurement sample, a low molecular weight additive (organic matter) called a matrix compound having laser ray absorption characteristics. In addition, mass spectrometry using MALDI ionizes measurement target molecules together with the matrix compound. Therefore, the success or failure of analysis is greatly affected by the selection of the matrix compound to be used, the quality of the mixture of the matrix compound with the measurement target molecules, and the like, making it also difficult to reproducibly perform mass spectrometry. As described above, conventional sample plates as described in Patent Documents 1 and 2 are not sufficient from the viewpoint of a matrix compound inevitably used and the reproducibility of analysis.

In addition, if a conventional sample plate as described in Non Patent Document 1 is used to coat the aqueous solution of a sample and then the sample is ionized by laser desorption/ionization (LDI), signals of components other than the sample (foreign substances) may be observed together. The sample plate is after all not sufficient in terms of reproducibly performing accurate mass spectrometry in laser desorption/ionization mass spectrometry.

The present invention has been made in view of the above problems of the conventional art, and aims to provide a sample plate for laser desorption/ionization mass spectrometry which provides an option not to use a matrix compound in mass spectrometry, which is capable of selectively supporting the sample on a sample spot, and which enables accurate analysis with good reproducibility that makes it possible to clearly confirm a signal of the sample in laser desorption/ionization mass spectrometry.

The present inventors have made earnest studies to achieve the above object, and have found as a result that, if a sample plate for laser desorption/ionization mass spectrometry includes a hydrophilic thin film capable of absorbing a laser ray and a water-repellent thin film comprising surface-hydrophobized nanoparticles and being stacked in a region other than a region to be a sample spot on a surface of the hydrophilic thin film, and a water contact angle of the water-repellent thin film is 120° or more, the sample plate provides an option not to use a matrix compound in mass spectrometry and is capable of selectively supporting the sample on a sample spot, and use of the sample plate enables accurate analysis with good reproducibility that makes it possible to clearly confirm a signal of the sample in laser desorption/ionization mass spectrometry. This finding has led to the completion of the present invention.

Specifically, a sample plate for laser desorption/ionization mass spectrometry of the present invention comprises:

a hydrophilic thin film capable of absorbing a laser ray; and a water-repellent thin film comprising surface-hydrophobized nanoparticles and being stacked in a region other than a region to be a sample spot on a surface of the hydrophilic thin film, wherein a water contact angle of the water-repellent thin film is 120° or more.

In the above-described sample plate for laser desorption/ionization mass spectrometry of the present invention, the hydrophilic thin film is preferably an organic silica thin film which is composed of organic silica having an organic group capable of absorbing a laser ray in a skeleton. In addition, if the hydrophilic thin film according to the present invention is the organic silica thin film, the organic silica thin film is more preferably a porous film having a textured structure in which dent parts are formed of column-shaped pores.

In the above-described sample plate for laser desorption/ionization mass spectrometry of the present invention, the water contact angle of the water-repellent thin film is more preferably 130° or more and is particularly preferably 150° or more.

In the above-described sample plate for laser desorption/ionization mass spectrometry of the present invention, if the hydrophilic thin film according to the present invention is the organic silica thin film, the organic group capable of absorbing a laser ray is preferably an organic group having an absorption local maximum wavelength in a wavelength range of 200 to 600 nm. Furthermore, such an organic group capable of absorbing a laser ray is preferably at least one selected from the group consisting of triphenylamine optionally having a substituent, naphthalimide optionally having a substituent, pyrene optionally having a substituent, perylene optionally having a substituent, and acridone optionally having a substituent, and is further preferably at least one selected from the group consisting of triphenylamine optionally having a substituent and naphthalimide optionally having a substituent.

In the above-described sample plate for laser desorption/ionization mass spectrometry of the present invention, an average particle diameter of the surface-hydrophobized nanoparticles is preferably 50 to 500 nm.

In the above-described sample plate for laser desorption/ionization mass spectrometry of the present invention, the surface-hydrophobized nanoparticles are preferably surface-hydrophobized silica nanoparticles having hydrophobic groups introduced on their surface. Moreover, such a hydrophobic group is preferably at least one selected from the group consisting of an alkyl group, a fluorinated alkyl group, an alkyl chloride group, and an alkyl bromide group, and is particularly preferably a fluorinated alkyl group.

Note that although it is not exactly clear why the sample plate for laser desorption/ionization mass spectrometry of the present invention achieves the above object, the present inventors presume as described below.

Here, first, the placement state (supported state) of the sample in the case of using various sample plates (including the conventional sample plate) is discussed below with reference to the drawings (note that in the following description and drawings, the same or corresponding elements are denoted by the same reference numerals in some cases, and redundant description is omitted). First, description is provided for an embodiment schematically illustrated in FIG. 1 as an example in the case where a hydrophilic region and a hydrophobic region are not formed on the surface of the sample plate. In the case where the sample plate of the form illustrated in FIG. 1 is used and a sample solution 11 having high affinity to the surface of the sample plate 10 is added dropwise (see FIG. 1(a)), the sample solution 11 spreads thinly on the surface of the plate 10 (see FIG. 1(b)). Therefore, it is considered that the concentration per unit area of the measurement target molecules (target molecules) to be analyzed is lowered, and the sample S is placed (supported) in a large region (see FIG. 1(c)). Thus, if the sample S is placed (supported) in a large region with a low concentration per unit area, the signals which can be confirmed at the time of analysis are weak even if the sample is subjected to laser desorption/ionization mass spectrometry using this. Therefore, it is apparently impossible to reproducibly perform accurate analysis that makes it possible to clearly confirm a signal of the sample.

In addition, description is further provided for another embodiment schematically illustrated in FIG. 2 as an example in the case where a hydrophilic region and a hydrophobic region are not formed on the surface of the sample plate. When the sample solution 11 having low affinity to the surface of the plate is coated by dropwise addition (see FIG. 2(a)), the solution of the sample remains in a very small region and is supported in a concentrated state (see FIG. 2(b)). Therefore, it is considered that, when the solvent evaporates (is dried in the case of water), the sample being a solute (sample containing measurement target molecules) precipitates in an aggregated state, and a distribution occurs in the concentration of the measurement target molecules in the precipitation region, making it impossible to uniformly place (support) the sample (see FIG. 2(c)). Thus, if there is a distribution in the concentration of sample S in the support region (if the sample is non-uniformly coated), the signal intensity varies with irradiation position of the laser ray even if laser desorption/ionization mass spectrometry of the sample is performed using this. Therefore, it is apparent that stable mass spectrometry is impossible.

In addition, discussion is further made on the case of using a sample plate without a hydrophilic region and a hydrophobic region formed on the surface as illustrated in FIG. 1 and FIG. 2. Even when the sample is coated, basically, the solution of the sample is likely to move, and an event of exuding from the coating position may also occur. Therefore, it is apparent that the coating position and the spot size of the sample cannot be determined, resulting in the variation in the measurement results.

Next, discussion is made on the case of using a conventional sample plate as described in Patent Documents 1 and 2 and Non Patent Document 1 described above. As an example of such a conventional sample plate, discussion is made as an example on a sample plate which is formed by stacking a hydrophobic film with an opening on a hydrophilic plate, the opening being a sample spot. FIG. 3 schematically illustrates one that can be preferably used as such sample plate. Here, the sample plate 10 of the embodiment illustrated in FIG. 3 is a hydrophilic plate (thin film) 10A with a hydrophobic film 10B stacked thereon, and is a plate in which the surface of the plate 10A is exposed at the opening. Consider the case where the sample solution 11 is added dropwise to the opening of the sample plate 10 (see FIG. 3(a)). It is considered that the sample solution can be held (supported) to some extent at the opening (see FIG. 3(b)), and that the solution 11 can be placed (supported) relatively uniformly in the desired region as compared with a plate without a hydrophilic region and a hydrophobic region formed on the surface. Then, when the solvent is removed after the sample solution is placed (supported) by being held in the opening in this manner, it is considered that the sample can be placed (supported) more uniformly as compared with a plate without a hydrophilic region and a hydrophobic region formed on the surface (see FIG. 3(c)).

However, even in the case of using conventional sample plates as described in Patent Documents 1 and 2 and Non Patent Document 1 described above, it was not always possible to reproducibly perform accurate mass spectrometry. This point is examined. First, in the sample plate as described in Patent Document 1, the hydrophobic area is formed of Teflon (registered trademark) or the like. If a smooth water-repellent layer is formed using Teflon (registered trademark), the water contact angle is 119° or less, but it is not necessarily possible to obtain sufficient water repellency on the surface with such a contact angle. As described above, the sample plate as described in Patent Document 1 cannot ensure sufficient water repellency in the hydrophobic area. Thus, due to this, it is inevitable that some of the measurement target molecules (sample) adhere to and remain in the hydrophobic area. Therefore, it is presumed that it is difficult to uniformly and selectively support a sample because sampling requires an expert in sampling technique in order to uniformly and selectively support a sample. In addition, in Patent Document 1 described above, from the content of disclosure, the surface of an anchor portion is considered to be formed by the surface of a metal sample support or metallized plastics. However, such metal sample support or metallized plastics is a material which does not absorb a laser ray in the first place. As above, Patent Document 1 does not describe any technical idea of efficiently using energy obtained by laser ray irradiation using a hydrophilic plate (thin film) by use of a substrate or the like capable of absorbing a laser ray as the hydrophilic plate (thin film) 10A. The present inventors speculate that, in combination of these points, it was not always possible to perform accurate mass spectrometry in the case of using a sample plate as described in Patent Document 1 above. Note that the sample plate as described in Patent Document 1 is a plate for MALDI, and enables laser desorption/ionization using a so-called matrix compound (low molecular weight additive) as an essential component. Therefore, it is considered that it is difficult in the first place to measure a sample with high detection sensitivity without using a matrix compound (it is difficult to directly analyze the sample).

Next, Patent Document 2 is examined. Patent Document 2 described above states that, regarding the sample plate formed in Example 1 thereof, the water contact angle of the organosilane layer was 117.2°. Note that, even when a specific surface is made hydrophobic by surface treatment using fluorosilane, the water contact angle is generally 118° at most. With this point in consideration, it is apparent that the water contact angle on the hydrophobic surface is 118° or less in the sample plate as described in Patent Document 2 above, and it is also apparent that sufficient water repellency cannot be ensured in the hydrophobic area. Thus, the sample plate as described in Patent Document 2 cannot ensure a sufficient water-repelling effect in the hydrophobic area, either. Therefore, due to this, it is also difficult after all to uniformly and selectively support the sample on each hydrophilic region (surface of stainless steel). In addition, also in Patent Document 2 described above, the sample spot (sampling area) is made of exposed hydrophilic stainless steel, but stainless steel is also a material which does not absorb a laser ray. Moreover, Patent Document 2 neither describes nor suggests at all e.g. the use of a thin film capable of absorbing a laser ray as a hydrophilic substrate. The present inventors speculate that, in combination of these points, it was not always possible to perform accurate mass spectrometry also in the case of using a sample plate as described in Patent Document 2 above. Note that, as in the case of the one described in Patent Document 1, the sample plate as described in Patent Document 2 is also a plate for MALDI, and enables laser desorption/ionization using a so-called matrix compound (low molecular weight additive) as an essential component. Therefore, it is considered that it is difficult in the first place to measure a sample with high detection sensitivity without using a matrix compound (it is difficult to directly analyze the sample).

As described above, conventional sample plates as described in Patent Documents 1 and 2 are not only difficult to sufficiently uniformly and selectively support the sample at a specific site, but also needs to use a matrix compound in mass spectrometry. Plus, the accuracy of mass spectrometry depends on the skill of sampling technique, the type of matrix compound (low molecular weight additive), and further the quality of the mixture of the matrix compound with the measurement target molecules, and the like. Therefore, those sample plates are not always sufficient in terms of measurement reproducibility.

Next, a conventional sample plate as described in Non Patent Document 1 described above is also examined. The conventional sample plate as described in Non Patent Document 1 described above is prepared by a multistep and complicated process combining photolithography, oxygen plasma treatment, and the like. When photolithography is used as described above, it is difficult to increase the area. At the same time, multistep treatment including a vacuum process is required, resulting in high cost. Moreover, applicable substrates are mainly limited to inorganic materials, making it difficult to produce a sample plate using a substrate containing an organic component. In addition, in order to use the conventional sample plate as described in Non Patent Document 1 described above for accurate mass spectrometry, the production step is required to remove the mask material or the like used for photolithography at a level which does not affect mass spectrometry (it is necessary to remove the residues so that the residue concentration is on the order of ppb or less), but it is generally difficult to carry out such a removal step. For this reason, in the conventional sample plate as described in Non Patent Document 1 described above, a residue such as the mask material used for photolithography may remain in a sample spot. When a sample solution is coated on the sample spot using it, a foreign substance is mixed in the solution, for example, and the foreign substance is placed (supported) in the sample spot together with the sample molecules. Therefore, it is difficult after all to carry out accurate mass spectrometry.

As described above, when a resin, a photoresist, a binder, and the like are used in the process of forming a hydrophobic layer, it can be easily predicted that they are mixed as molecular impurities to affect the results of mass spectrometry. From such a viewpoint, in the case of using a conventional sample plate as described in Non Patent Document 1 described above or the like, it is presumed that it was not necessarily possible to perform mass spectrometry capable of accurately measuring a sample serving as a target.

On the other hand, as described above, the sample plate of the present invention has a configuration including a hydrophilic thin film capable of absorbing a laser ray and a water-repellent thin film comprising surface-hydrophobized nanoparticles. Hereinafter, description is provided with reference to FIG. 4 (schematic vertical cross-sectional view schematically illustrating a preferred embodiment of the sample plate for laser desorption/ionization mass spectrometry of the present invention). As illustrated in FIG. 4, the present invention uses a hydrophilic thin film capable of absorbing a laser ray as a hydrophilic thin film 101. Use of the thin film 101 capable of absorbing a laser ray in this manner also enables demonstration of the performance (LDI support performance) which makes it possible to efficiently transfer the energy of the laser ray absorbed by the thin film to the sample placed (supported) on the hydrophilic thin film and to ionize the sample. Therefore, it is presumed that it is possible to more efficiently ionize the sample without using a so-called matrix compound (low molecular weight additive) which makes it possible to more efficiently use the energy of laser ray than in the case of using a metal sample plate which cannot absorb a laser ray. As described above, use of the hydrophilic thin film 101 makes it possible to more efficiently perform ionization than in the case of using a metal sample plate or the like. Therefore, it is presumed that it is possible to carry out accurate analysis that makes it possible to more clearly confirm a signal of the sample.

In addition, the present invention includes a water-repellent thin film 102 comprising surface-hydrophobized nanoparticles and being stacked in a region other than a region to be a sample spot on the hydrophilic thin film 101. In the case of forming an opening to be a sample spot in the thin film 102 comprising nanoparticles, the production of the water-repellent thin film 102 does not need to use photolithography, and an opening as a sample spot can be easily formed by putting a metal or plastic cone or the like as a mask at a portion to be an opening on the hydrophilic thin film to mask the region to be a sample spot (cover the region to be a sample spot with a mask), coating a nanoparticle-containing dispersion liquid on its periphery, and drying the liquid and then removing the mask. In the case of production as described above, a sample spot (region for placing a sample) being a hydrophilic area exposed to the outside and a water-repellent thin film covering the periphery thereof can be easily stacked without leaving production residue in the sample spot. Thus, no signal of residue is generated in mass spectrometry. Since the water-repellent thin film 102 is produced by nanoparticles in the sample plate 10 of the present invention as described above, it is unnecessary to use photolithography, and production is easily possible by using a cone or the like that fits to the size of the opening as a mask to coat a dispersion liquid of nanoparticles (fine particles). Therefore, there is no concern of leaving a production residue in the sample spot, and it is possible to sufficiently suppress the occurrence of mixing (occurrence of contamination) of foreign substances (residues having volatile properties) which may affect the results of mass spectrometry. Moreover, it is apparent that the treatment is extremely simple (the methods usable for coating are also diverse, such as solution coating, spray coating, and inkjet printing), the cost can be reduced, and the area of the sample plate can be easily increased. In addition, consider the case of using surface-hydrophobized nanoparticles for the formation of a water-repellent thin film. Since the nanoparticles themselves are non-volatile, no signal derived from the particles is confirmed in mass spectrometry even when such particles are mixed into the sample, meaning that contamination does not occur. In addition, in the present invention, the water-repellent thin film 102 is formed of surface-hydrophobized nanoparticles, and the water-repellent thin film 102 basically has a structure in which particles are multi-stacked. Therefore, a texture ranging from nanoscale to micron scale is spontaneously formed on the surface of the thin film 102 by nanoparticle stacking. As described above, the formation of the nanoscale to micron scale fine textured structure efficiently forms a hydrophobic air layer on the surface, thereby further enhancing the hydrophobicity. Therefore, the thin film 102 has higher water repellency such that the water contact angle is 120° or more (particularly preferably, super water repellency such that the water contact angle is 150° or more). Note that, on the other hand, it is difficult to exhibit high water repellency (preferably super water repellency) such that the water contact angle is 120° or more even if the hydrophilic thin film 101 is subjected to surface treatment simply by using a silane coupling material. Consider the sample plate 10 using the water-repellent thin film 102 with a water contact angle of 120° or more. The case of coating the sample solution in the sample spot formed as an opening (region whose periphery is covered with the water-repellent thin film) (see FIG. 4(a)) makes it possible to obtain a higher water-repelling effect than in the case of using a water-repellent thin film with a water contact angle of less than 120°. The case of introducing the solution 11 into the sample spot (see FIG. 4(b)) makes it possible to more sufficiently prevent the exudation or the like of the sample solution 11 and moreover to easily return the droplets to the right position by the water-repelling effect even when the sample solution is deposited at a position deviated from the spot. Therefore, after the removal of the solvent, the sample S can be more efficiently placed (supported) only in the region of the sample spot (see FIG. 4(c)). Thus, in the sample plate 10 of the present invention, coating the sample solution 11 onto the plate 10 makes it possible to more reliably and stably place (support) the sample S at a predetermined place thanks to the high water-repelling effect of the surface of the thin film 102 formed of nanoparticles (thin film surface having a textured structure). Therefore, it is considered that the reproducibility of mass spectrometry is also greatly improved.

In addition, in the case of using the water-repellent thin film 102 having a water contact angle of 120° or more in the hydrophobic area as in the sample plate 10 of the present invention, the region (area) to be coated with the sample solution 11 can be more efficiently limited by the water-repellent thin film 102. Thus, the sample S can be effectively concentrated as the solvent evaporates, and the sample S can also be efficiently supported in the sample spot at a concentration suitable for mass spectrometry. This also makes it possible to efficiently enhance the signal intensity in mass spectrometry. Moreover, in the case of using a water-repellent thin film having a water contact angle of 120° or more, it is possible to completely remove droplets of the sample solution from the water-repellent area before the solvent evaporates. Thus, it is also possible to make more uniform the concentration distribution of the sample supported in the region of the sample spot. Therefore, thanks to the configuration of the sample plate 10 of the present invention, it is possible to uniformly and reproducibly place the sample at a predetermined place and in the same spread manner no matter who coats the sample solution 11 (whoever samples it) regardless of the skill of sampling technique. Therefore, the present inventors speculate that, even in comparison with conventional sample plates as described in Patent Documents 1 and 2 and Non Patent Document 1 described above, it is possible to more reproducibly perform, in laser desorption/ionization mass spectrometry, accurate analysis that makes it possible to clearly confirm a signal of the sample while sufficiently suppressing the influence of contaminants other than the sample.

The present invention makes it possible to provide a sample plate for laser desorption/ionization mass spectrometry which provides an option not to use a matrix compound in mass spectrometry, which is capable of selectively supporting the sample on a sample spot, and which enables accurate analysis with good reproducibility that makes it possible to clearly confirm a signal of the sample in laser desorption/ionization mass spectrometry.

DETAILED DESCRIPTION OF THE PREFERRED EMBODIMENTS

Figure 1:
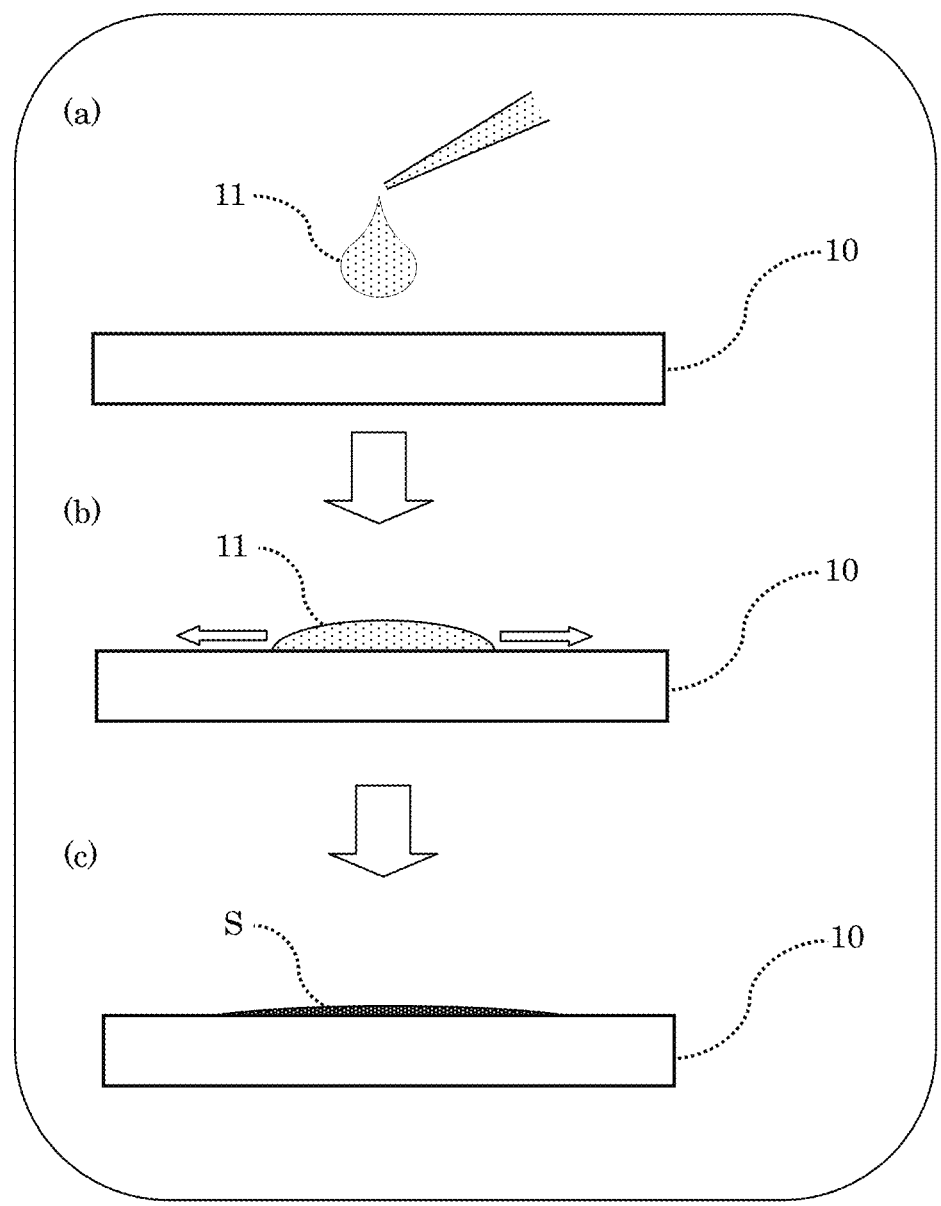
FIG. 1 is a schematic diagram illustrating a preferred embodiment for the case of coating a sample plate with a sample solution having high affinity to its surface, the sample plate having a form without a hydrophilic region and a hydrophobic region formed on the surface.
Figure 2:
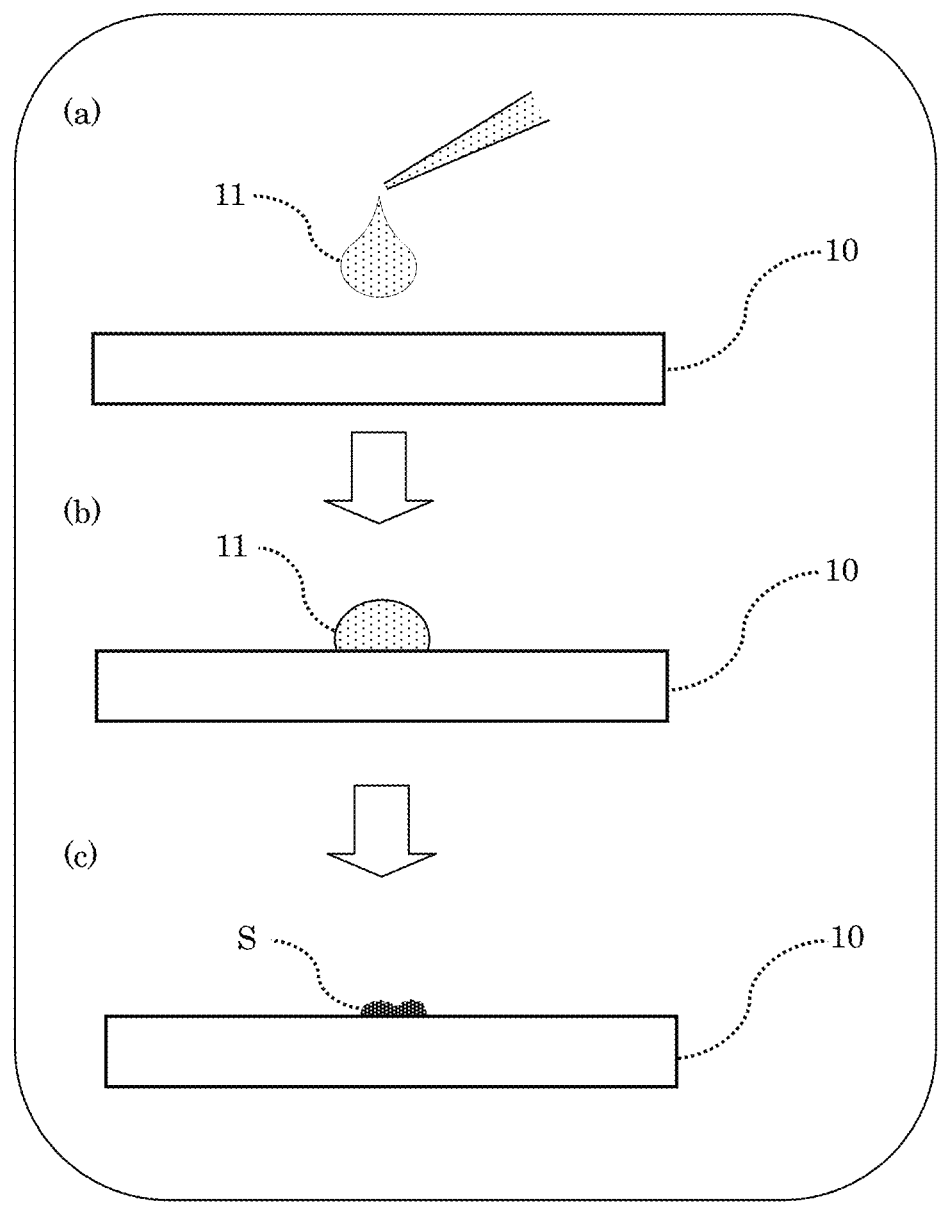
FIG. 2 is a schematic diagram illustrating a preferred embodiment for the case of coating a sample plate with a sample solution having low affinity to its surface, the sample plate having a form without a hydrophilic region and a hydrophobic region formed on the surface.
Figure 3:
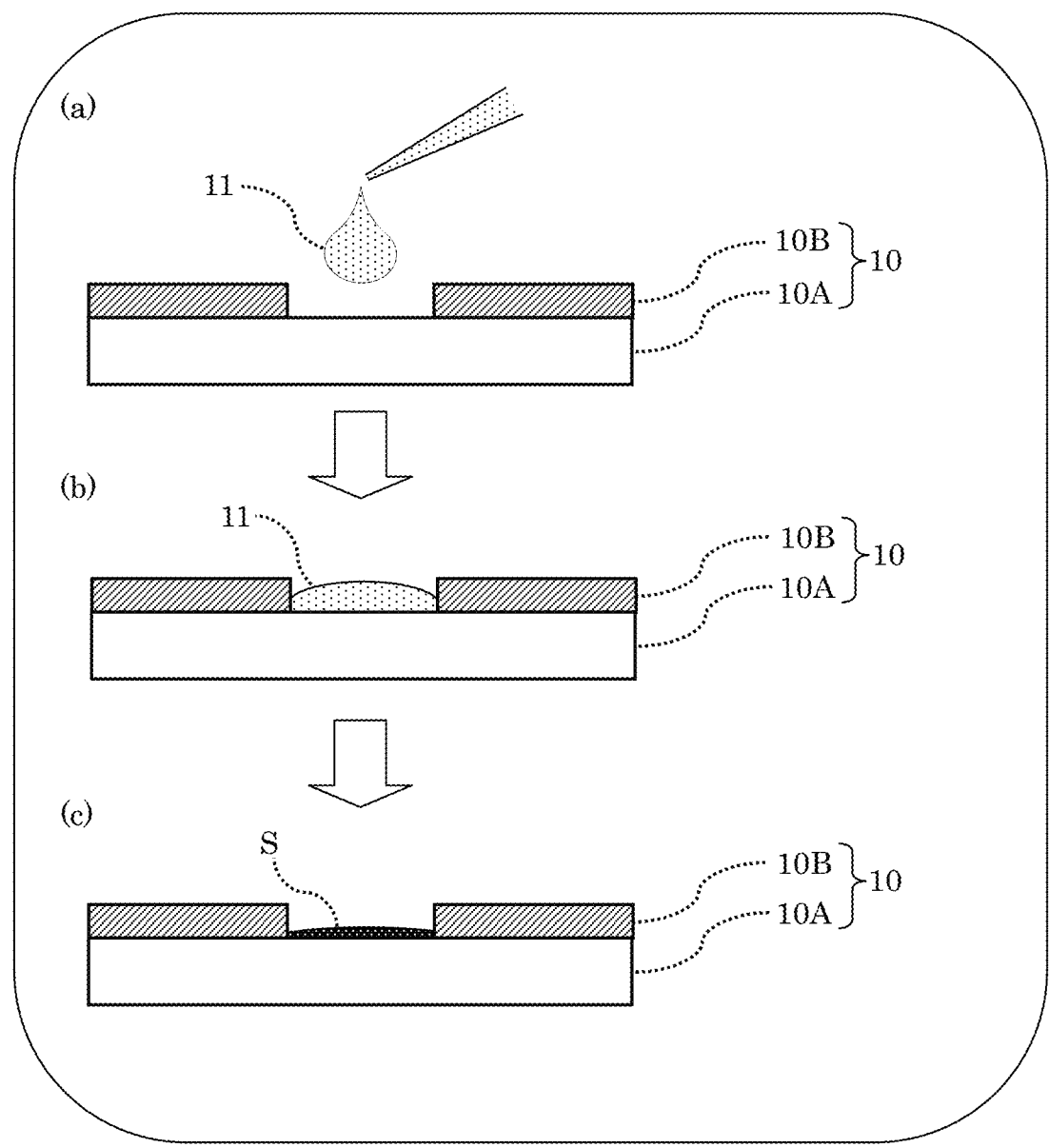
FIG. 3 is a schematic diagram illustrating a preferred embodiment for the case of coating a sample plate with a sample solution, the sample plate formed by stacking a hydrophobic film with an opening on a hydrophilic plate, and the opening being a sample spot.
Figure 4:
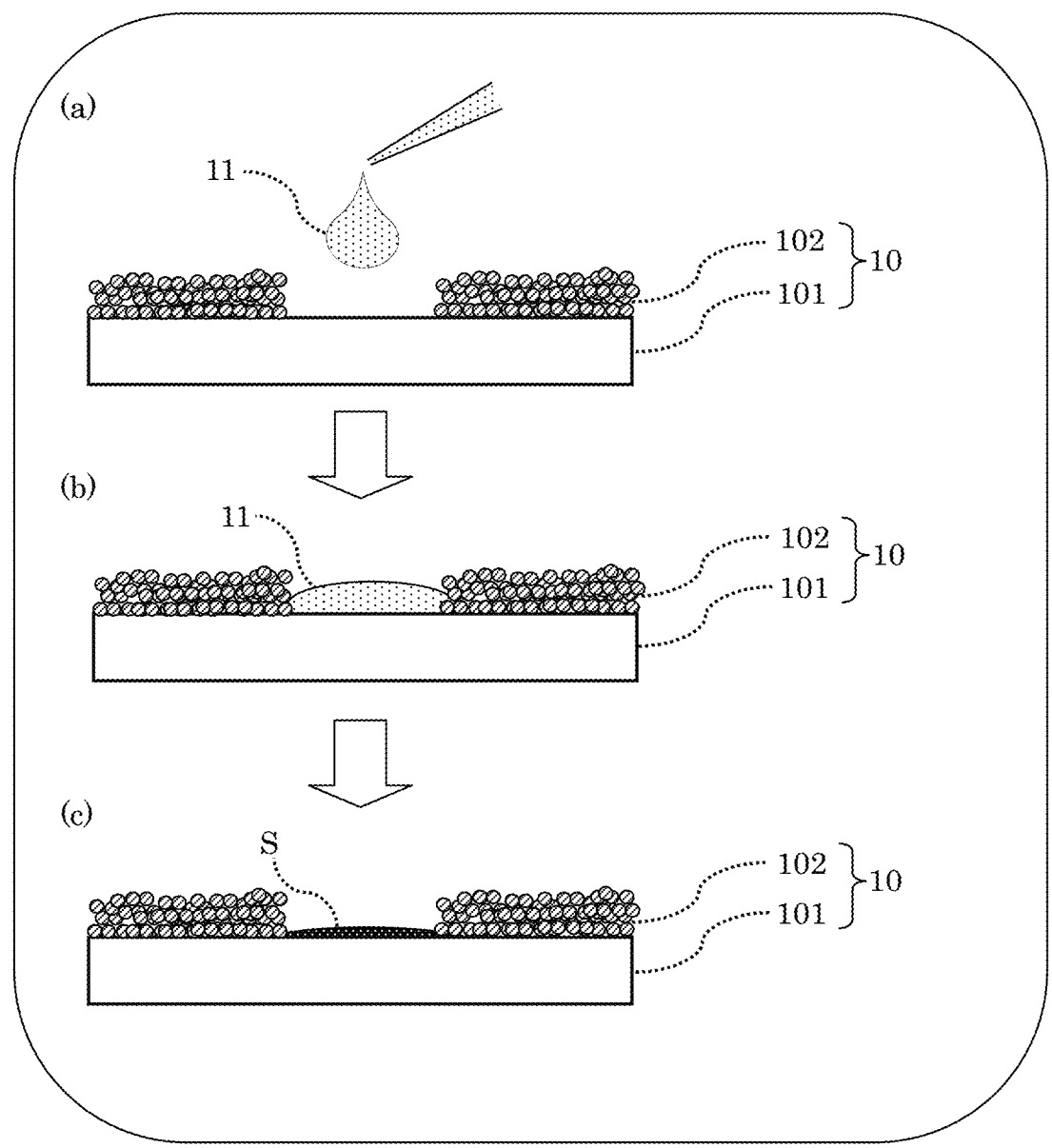
FIG. 4 is a schematic diagram illustrating a preferred embodiment for the case of coating a sample plate with a sample solution, the sample plate being an embodiment preferably usable as a sample plate of the present invention.

Hereinafter, the present invention is described in detail based on its preferred embodiments. Note that, in the following, preferred embodiments of the present invention are described with reference to the drawings depending on the case, but in the following description and the drawings, the same or corresponding elements are denoted by the same reference numerals, and redundant explanation is omitted.

A sample plate for laser desorption/ionization mass spectrometry of the present invention comprises:

a hydrophilic thin film capable of absorbing a laser ray; and a water-repellent thin film comprising surface-hydrophobized nanoparticles and being stacked in a region other than a region to be a sample spot on a surface of the hydrophilic thin film, wherein a water contact angle of the water-repellent thin film is 120° or more.

(Hydrophilic Thin Film)

The hydrophilic thin film included in the sample plate for laser desorption/ionization mass spectrometry of the present invention is a hydrophilic thin film capable of absorbing a laser ray. The hydrophilic thin film is preferably a film having a water contact angle of 80° or less. As described above, in the present invention, the "water contact angle" is employed as an index of hydrophilicity, and a film having a water contact angle of 80° or less can be preferably used as a hydrophilic thin film. In addition, the hydrophilic thin film is a thin film having a water contact angle of more preferably 80° (further preferably 75° and particularly preferably 70°) or less. Note that the "water contact angle" employed herein is a value obtained by bringing droplets of purified water each in an amount of 0.5 μL into contact with the surface by use of a commercially available contact angle meter (for example, Contact Angle Meter DM-501 manufactured by Kyowa Interface Science, Inc), measuring contact angles at five different arbitrary positions (measurement positions), and then calculating the average of the measured values of the water contact angles at these five points.

In addition, the property of the thin film "capable of absorbing a laser ray" can be easily achieved if the thin film has a structure capable of absorbing a laser ray used in mass spectrometry (such as an organic group to be described later). Note that the absorption wavelength and the like are not particularly limited regarding the property "capable of absorbing a laser ray," and it suffices that the laser ray of a certain wavelength can be absorbed. Note that the wavelength of the laser ray which can be absorbed by the hydrophilic thin film is preferably 200 to 600 nm (further preferably 250 to 450 nm and particularly preferably 300 to 400 nm). Therefore, the hydrophilic thin film is made of a material having an absorption local maximum wavelength at preferably 200 to 600 nm (further preferably 250 to 450 nm and particularly preferably 300 to 400 nm).

In addition, such a hydrophilic thin film is not particularly limited as long as it can absorb a laser ray and is a thin film having hydrophilicity, but is more preferably an organic silica thin film which is composed of organic silica having an organic group capable of absorbing a laser ray in a skeleton. In addition, the "organic group capable of absorbing a laser ray" possessed by the organic silica thin film in a skeleton is an organic group having an absorption local maximum wavelength in a range of preferably 200 to 600 nm (further preferably 250 to 450 nm and particularly preferably 300 to 400 nm). Consider the case where the absorption local maximum wavelength of such an organic group is less than the lower limit. When the thin film is used for laser desorption/ionization (LDI) and a laser ray of such a wavelength is absorbed, the organic group in the organic silica thin film together with the measurement target object (measurement target molecules) are decomposed by the light. Therefore, there is a tendency that, as a result, efficient mass spectrometry becomes difficult. On the other hand, when the upper limit is exceeded, there is a tendency that it is difficult to obtain optical energy necessary for the ionization of measurement target molecules even in the case of irradiation with the light of such a wavelength followed by absorption thereof. As described above, when the organic group has an absorption local maximum wavelength in the wavelength range, it becomes possible to more efficiently absorb a laser ray in a wavelength region used for mass spectrometry.

In addition, examples of such an "organic group capable of absorbing a laser ray" possessed by the organic silica thin film in a skeleton include organic groups having a structural part capable of absorbing a laser ray used for mass spectrometry. Although it depends on the wavelength of the laser ray used, examples of such organic groups include organic groups having an aromatic ring as a structural part capable of absorbing a laser ray (for example, triphenylamine, naphthalimide, fluorene, acridone, methyl acridone, quaterphenyl, anthracene, and the like). As described above, examples of the organic group capable of absorbing a laser ray (organic group having an absorption local maximum wavelength in a wavelength range of 200 to 600 nm) include triphenylamine, naphthalimide, styrylbenzene, fluorene, divinylbenzene, divinylpyridine, acridone, methyl acridone, quaterphenyl, and anthracene, each of which may have a substituent.

Moreover, such an organic group capable of absorbing a laser ray (organic group having an absorption local maximum wavelength in a wavelength range of preferably 200 to 600 nm) is more preferably an aromatic organic group containing 10 or more carbon atoms. Such an aromatic organic group makes it possible to more efficiently absorb a laser ray. Examples of such an aromatic organic group include triphenylamine, naphthalimide, styrylbenzene, fluorene, acridone, methyl acridone, quaterphenyl, anthracene, pyrene, acridine, phenylpyridine, perylene, perylene bisimide, diphenylpyrene, tetraphenylpyrene, porphyrins, phthalocyanine, diketopyrrolopyrroles, and dithienylbenzothiadiazole, each of which may have a substituent. In addition, as the organic group, the organic silica thin film may be one having one kind of organic group singly or may be one having two or more kinds of organic groups in combination. Among such organic groups, from the viewpoint of chemical stability against light irradiation, it is preferable to contain at least one of triphenylamine, naphthalimide, pyrene, perylene, and acridone (at least one of the organic groups is at least one of triphenylamine, naphthalimide, pyrene, perylene, and acridone).

In addition, "organic group in a skeleton" in the organic silica thin film means that the organic group present is directly or indirectly bonded (via other elements) to the silicon (Si) forming the silica skeleton of the silica thin film. Note that such an organic silica thin film more preferably has an organic group introduced in the skeleton thanks to the structure (cross-linking structure) in which silicon atoms forming the siloxane structure (formula: —(Si—O)$_y$-structure) are cross-linked by the organic group.

In addition, in the organic silica thin film, the content ratio of silicon and the organic group capable of absorbing a laser ray, both of which constitute the organic silica, is preferably in a range of 0.05 to 0.50 (more preferably 0.10 to 0.40, further preferably 0.10 to 0.35, and particularly preferably 0.15 to 0.35) based on the ratio of the mass of the silicon to the mass of the organic group ([mass of the silicon]/[mass of the organic group]). When such a mass ratio ([mass of the silicon]/[mass of the organic group]) is less than the lower limit, the cross-linking density of the organic silica thin film reduces, resulting in a tendency that the film is not sufficiently hardened. On the other hand, when the upper limit is exceeded, the relative decrease in density of organic groups tends to lower the absorption intensity of laser ray. Moreover, in the case of producing a film having a textured structure (for example a porous structure), the cross-linking degree excessively increases in the stage of film formation, resulting in a tendency that it is difficult to form a textured structure (for example, porous structure) by nanoimprinting. As an organic silica thin film with such a mass ratio, it is possible to preferably use a thin film composed of a polymer (condensate) of an organic silicon compound which has an organic group having a local maximum absorption wavelength in a wavelength range of 200 to 600 nm as an organic group capable of absorbing a laser ray and in which the content ratio of silicon and the organic group is in a range of 0.05 to 0.50 (more preferably 0.10 to 0.40, further preferably 0.10 to 0.35, and particularly preferably 0.15 to 0.35) based on the ratio of the mass of the silicon to the mass of the organic group ([mass of the silicon]/[mass of the organic group]).

Such an organic silicon compound is preferably an organic silicon compound which is represented by the following general formulas (1-i) to (1-iv):

(1-i)

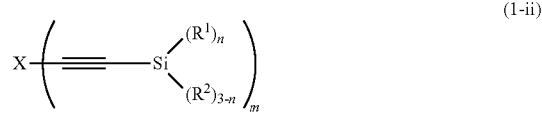

(1-ii)

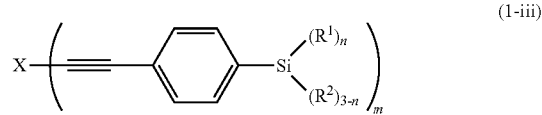

(1-iii)

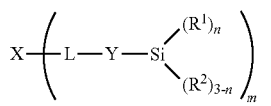

(in the formulas (1-i) to (1-iv), X represents an m-valent organic group, R¹ represents at least one selected from the group consisting of alkoxy groups (preferably alkoxy groups having 1 to 5 carbon atoms), hydroxyl groups (—OH), allyl groups (CH₂=CH—CH₂—), ester groups (preferably ester groups having 1 to 5 carbon atoms), and halogen atoms (chlorine atoms, fluorine atoms, bromine atoms, and iodine atoms), R² represents at least one selected from the group consisting of alkyl groups and hydrogen atoms, n and (3-n) respectively represent the numbers of R¹'s and R²'s bonded to silicon (Si) atoms, n represents an integer of 1 to 3, m represents an integer of 1 to 4, L in the formula (1-iv) represents a single bond or any one divalent organic group selected from the group consisting of ether groups, ester groups, amino groups, amide groups, and urethane groups, and Y in the formula (1-iv) represents an alkylene group having 1 to 4 carbon atoms)

and in which a content ratio of silicon and the light absorbable organic group is in a range of 0.05 to 0.50 based on a ratio of a mass of the silicon to a mass of the organic group capable of absorbing a laser ray ([mass of the silicon]/[mass of the organic group]). Consider the "organic group capable of absorbing a laser ray" in the compounds represented by such general formulas (1-i) to (1-iv). In the compound represented by the general formula (1-i), the group represented by X in the formula (m-valent organic group (bonds omitted)) is the "organic group capable of absorbing a laser ray." In the compound represented by the general formula (1-ii), the organic group represented by the formula:

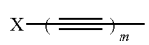 (I)

(in the formula (I), X represents an m-valent organic group, and m represents an integer of 1 to 4 (as described above, X and m have the same meanings as those of X and m in the general formulas (1-i) to (1-iv)))

is the "organic group capable of absorbing a laser ray." In addition, in the compound represented by the general formula (1-iii), the organic group represented by the formula:

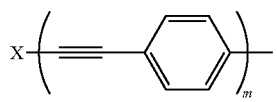 (II)

(in the formula (II), X represents an m-valent organic group, and m represents an integer of 1 to 4 (as described above, X and m have the same meanings as those of X and m in the general formulas (1-i) to (1-iv)))

is the "organic group capable of absorbing a laser ray." In the compound represented by the general formula (1-iv), the organic group represented by the formula:

 (III)

(in the formula (III), X represents an m-valent organic group, L represents a single bond or any one divalent organic group selected from the group consisting of ether groups, ester groups, amino groups, amide groups, and urethane groups, Y represents an alkylene group having 1 to 4 carbon atoms, and m represents an integer of 1 to 4 (as described above, X, L, Y and m have the same meanings as those of X, L, Y, and m in the general formula (1-iv)) is the "organic group capable of absorbing a laser ray." As described above, the "organic group capable of absorbing a laser ray" is the organic group of the structural part which is a group bonding to silicon in the compound and which contains the group represented by X in the formula.

The organic silica thin film is preferably an organic silica thin film comprising a polymer of at least one organic silicon compound selected from the group consisting of organic silicon compounds which are represented by the above general formulas (1-i) to (1-iv) and in which a content ratio of silicon and the light absorbable organic group is in a range of 0.05 to 0.50 based on a ratio of a mass of the silicon to a mass of the light absorbable organic group ([mass of the silicon]/[mass of the organic group]) (hereinafter, the group consisting of those organic silicon compounds is simply referred to as the "compound group (A)" in some cases for convenience). As described above, the organic silica thin film is preferably an organic silica thin film comprising a polymer of one organic silicon compound selected from the compound group (A).

Such an organic silica thin film comprising a polymer of at least one organic silicon compound selected from the compound group (A) tends to make it possible to more efficiently exhibit a so-called light-collecting antenna function and thus tends to make it possible to more efficiently ionize measurement target molecules. Note that the "light-collecting antenna function" mentioned here refers to a function of absorbing optical energy when irradiated with light and concentrating the excited energy inside the pores, and use of this function tends to make it possible to more efficiently transfer the optical energy of the absorbed laser ray to the measurement target molecules supported inside the pores. Note that the definition of such a "light-collecting antenna function" is the same as the definition described in Japanese Unexamined Patent Application Publication No. 2008-084836.

In addition, the polymer of at least one organic silicon compound selected from the compound group (A) is one that has a structure (cross-linking structure) in which silicon atoms forming the siloxane structure (structure represented by the formula: —(Si—O)ᵧ—) are cross-linked by the organic group and thus has a structure having the organic group in the skeleton (so-called "cross-linked type organic silica thin film"). Here, description is provided for the cross-linking structure taking as an example the polymerization reaction of the organic silicon compound which is represented by the above general formula (1-i) and in which R¹ is an ethoxy group, n is 3, and m is 2. By a reaction as represented by the following general formula (2):

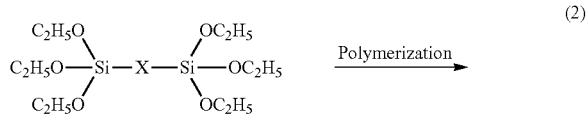 (2)

-continued

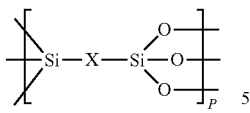

(in the formula, X represents an m-valent organic group, and p represents an integer corresponding to the number of repeating units), the organic silica thin film obtained after the polymerization is one that has a repeating unit with a structure in which silicon atoms forming the siloxane structure (structure represented by the formula: —(Si—O)$_y$—) are cross-linked by the organic group (X) (note that the value of p is not particularly limited, but is preferably in a range of about 10 to 1000 in general). Note that, when such a cross-linking structure is formed (when the organic silica thin film is the cross-linked type organic silica thin film) and used for mass spectrometry, it tends to more efficiently absorb the irradiation laser ray and to more efficiently transfer the excited energy to the measurement target molecules supported inside the pores of the organic silica thin film. Note that, in the organic silica comprising a polymer having the repeating unit represented by the general formula (2), the ratio between the total amount (mass) of the organic group (X) and the total amount (mass) of Si in the organic silica ([mass of the silicon]/[mass of the organic group]) is preferably a value in a range of 0.05 to 0.50.

In addition, R$^1$ in the above general formulas (1-i) to (1-iv) is preferably an alkoxy group and/or a hydroxyl group from the viewpoint of easily controlling the condensation reaction (polymerization reaction). Note that, when more than one R$^1$ is present in the same molecule, the R$^1$'s may be the same or different. Such an alkyl group which can be selected as R$^2$ in the general formulas (1-i) to (1-iv) is preferably an alkyl group having 1 to 5 carbon atoms. Note that, when more than one R$^2$ is present in the same molecule, the R$^2$'s may be the same or different.

In the above general formulas (1-i) to (1-iv), n and (3-n) in the formulas respectively represent the numbers of R$^1$'s and R$^2$'s bonded to silicon (Si) atoms. Although n represents an integer of 1 to 3, n is particularly preferably 3 from the viewpoint that it is possible to more stabilize the structure after condensation.

Moreover, m in the above general formulas (1-i) to (1-iv) represents the number of silicon (Si) atoms directly or indirectly bonded to the organic group (X). Such m represents an integer of 1 to 4. Such m is more preferably 2 to 4 (particularly preferably 2 or 3) from the viewpoint of easily forming a stable siloxane network.

In addition, L in the formula (1-iv) is more preferably a single bond or an ether group from the viewpoint of achieving high chemical stability. Note that, when more than one L is present in the same molecule, the L's may be the same or different. Moreover, Y in the formula (1-iv) is more preferably an ethylene group or a propylene group from the viewpoint of achieving both flexibility of the film and high densification of silicon after polymerization. Note that, when more than one Y is present in the same molecule, the Y's may be the same or different.

In addition, X in the above general formulas (1-i) to (1-iv) represents an m-valent organic group. In addition, such an m-valent organic group is particularly preferably any of the organic groups represented especially by the following general formulas (101) to (112):

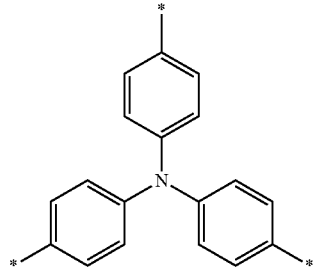
(101)

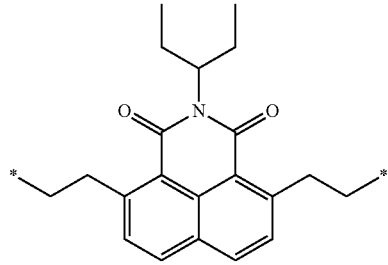
(102)

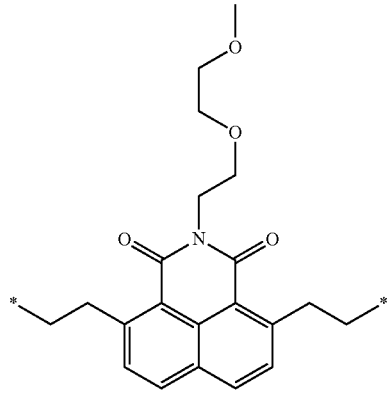
(103)

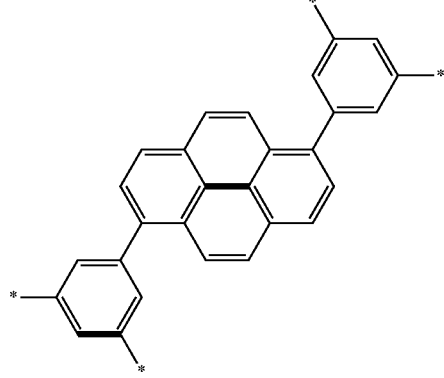
(104)

(105) 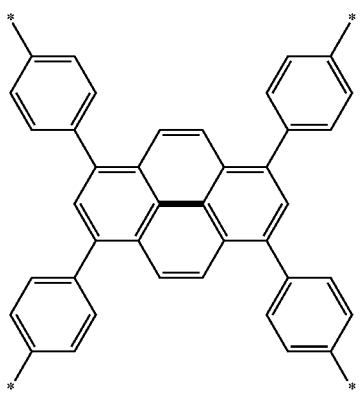

(106) 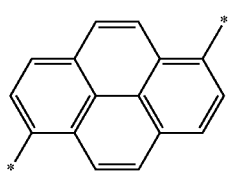

(107) 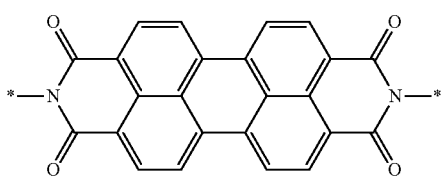

(108) 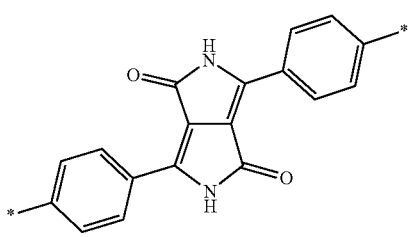

(109) 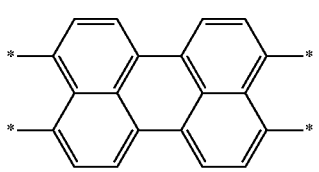

(110) 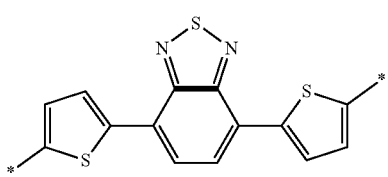

(111)

(112)

(in the general formulas (101) to (112), the symbol * means that the bond added with the symbol is a bond which binds to X in the above formulas (1-i) to (1-iv)).

Note that, in such organic groups represented by the general formulas (101) to (112), the bonds represented by the symbol * are more preferably directly bonded to silicon from the viewpoint of stable immobilization and high densification of the organic group.

Such an organic group (X in the formulas (1-i) to (1-iv)) is more preferably any of the organic groups represented by the above general formulas (101) to (110) (organic groups represented by the above formulas (101), (102), (103), (104), (105), (106), (107), (108), (109), and (110)), further preferably any of the organic groups represented by the above general formulas (101) to (106) and (109), and particularly preferably any of the organic group represented by the above general formula (101) (triphenylamine) and the organic groups represented by the above general formulas (102) and (103) (organic groups having a naphthalimide ring in the structure).

In addition, the "organic group capable of absorbing a laser ray" possessed by the organic silica thin film is particularly preferably an organic group having a naphthalimide ring in the structure from the viewpoint of high chemical stability and capability of absorbing a laser ray having a wavelength of 300 to 400 nm.

In addition, the organic silica thin film which is composed of organic silica having an organic group capable of absorbing a laser ray in a skeleton may be one having one kind of organic group singly or may be one having two or more kinds of organic groups in combination. Note that examples of the organic silica thin film having two or more kinds of organic groups in combination include polymers of organic silicon compounds of two or more kinds which are represented by any of the above general formulas (1-i) to (1-iv) and which have different kinds of X.

Note that the polymer of at least one organic silicon compound selected from the aforementioned compound group (A) may contain, in the organic silicon compound for preparation of the polymer, a different organic silicon compound other than one selected from the aforementioned compound group (A) as long as the effects of the present invention are not impaired (for example, as long as the thin film itself satisfies the conditions of e.g. the ratio of the mass of the silicon to the mass of the organic group). Examples of such a different organic silicon compound include tetraalkoxysilanes such as tetramethoxysilane, tetraethoxysilane, and tetrabutoxysilane.

In addition, when the hydrophilic thin film according to the present invention is the organic silica thin film, it is possible to preferably use, as the organic silica thin film, a porous film having a textured structure in which dent parts are formed of column-shaped pores from the viewpoint of signal intensity enhancement in mass spectrometry. Consider the case of coating a sample solution in a sample spot on the surface of the porous film having a textured structure in which dent parts are formed of column-shaped pores. The improved hydrophilicity due to texture formation makes the solution spread more uniformly in the sample spot. This allows the sample to be supported thinner on the substrate surface without the formation of sample aggregates. Therefore, it is possible to obtain a more uniform and stronger mass spectrometric signal. Note that "column-shaped" mentioned here is a concept which also includes so-called column-shaped ones such as substantial cylinders and substantial polygonal prisms as well as ones having both end portions of different sizes (such as diameter and length) such as substantial cones and substantial polygonal pyramids. Such a textured structure can be efficiently produced by nanoimprinting. For example, when the mold used for nanoimprinting is one that has a pillar array structure, a porous structure transcribed with the characteristics thereof can be the textured structure of the thin film. Note that, when a textured structure is formed by nanoimprinting, a mold having a textured structure may be used to form a textured structure by repeating transcription and inversion thereof.

Figure 5:
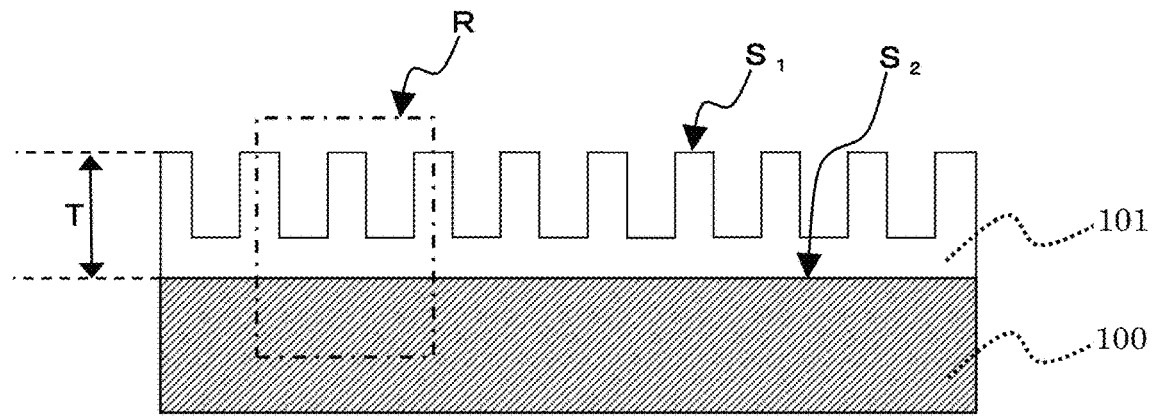
FIG. 5 is a schematic vertical cross-sectional view schematically illustrating a preferred embodiment of a layer stack (multi-layer structural body) including an organic silica thin film (porous film).

In addition, when the organic silica thin film is the porous film, preferably, an axis direction of the textured structure is a direction substantially perpendicular to a surface opposite to a surface of the organic silica thin film having the textured structure formed therein. Hereinafter, the "axis direction of the textured structure" mentioned here is briefly described with reference to the drawings. FIG. 5 is a schematic vertical cross-sectional view schematically illustrating a preferred embodiment of a layer stack (multi-layer structural body) including a substrate 100 and an organic silica thin film (porous film) 101 having a textured structure stacked on the substrate 100. Here, the "axis direction of the textured structure is a direction substantially perpendicular to a surface opposite to a surface of the organic silica thin film having the textured structure formed therein" means that, for example when the gaps of the textured portion of the organic silica thin film 101 (spaces between dent parts) are column-shaped pores (when the organic silica thin film 101 has a porous structure), the direction of the longitudinal axis of the spatial shape of the pores (shape of the gaps) is substantially perpendicular to the surface $S_2$ opposite to the surface $S_1$ of the organic silica thin film 101 having the textured structure formed therein. As described above, the "axis direction of the textured structure" refers to the direction of the longitudinal axis of the pores when the textured structure is a porous structure. In addition, the "longitudinal axis" mentioned here refers to the axis of the longitudinal direction of the pore gap shape, and can be obtained based on the vertical cross-sectional view of the column-shaped body.

Figure 6:
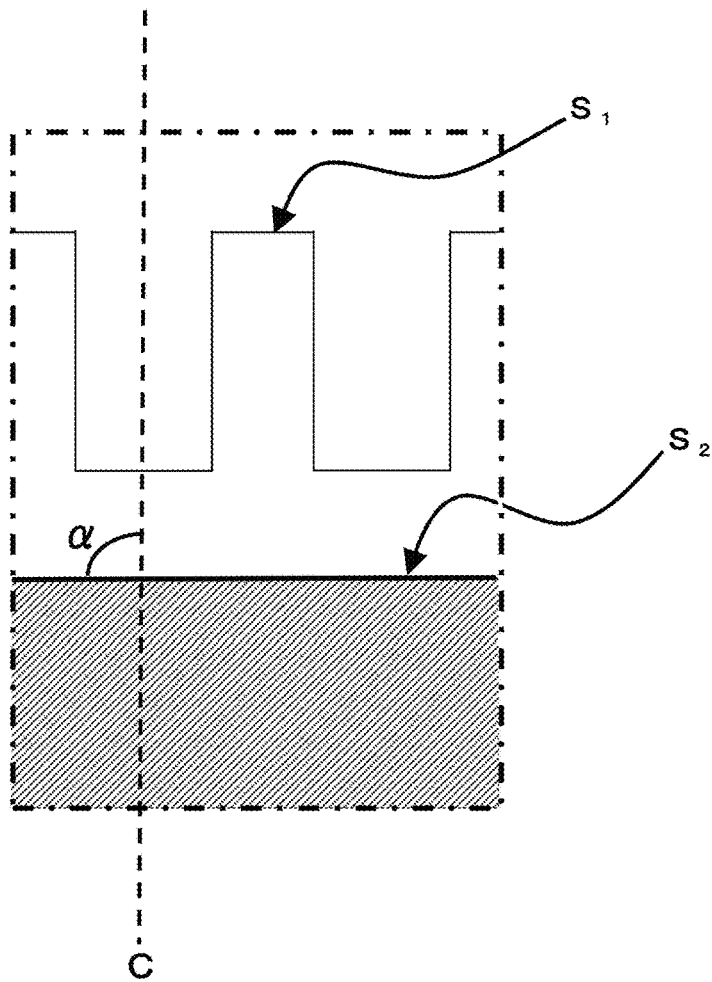
FIG. 6 is an enlarged diagram of a region R of the organic silica thin film illustrated in FIG. 5.

Next, description is provided for the concept "substantially perpendicular" herein with reference to FIG. 6. FIG. 6 is an enlarged diagram of the region R illustrated in FIG. 5. Here, description is provided taking as an example the case where the gaps of the textured portion as illustrated in FIG. 5 and FIG. 6 (spaces between dent parts) are column-shaped pores (case where a porous structure having column-shaped pores as the dent parts is formed on the surface S1 side of the thin film). The situation where the axis direction of the textured structure is a direction substantially perpendicular to the surface $S_2$ means that the longitudinal axis C of the pore spatial shape (gap column shape) (longitudinal axis C of the pore) forms an angle $\alpha$ in a range of 90°±30° (more preferably 90°±20°) with respect to the surface $S_2$ opposite to the surface $S_1$ of the organic silica thin film 101 having the textured structure formed therein.

As described above, in the textured structure formed in the organic silica thin film 101, the axis direction of the textured structure is preferably a direction substantially perpendicular (90°±30°, more preferably 90°±20°) to the surface $S_2$ of the organic silica thin film 101. Note that, when the axis direction of the textured structure formed in the organic silica thin film 101 is not the substantially perpendicular direction described above, it tends to be difficult to desorb and vaporize molecules adsorbed to the gaps of the texture (pore spaces in the case of pores) to the outside of the film even when used for mass spectrometry and irradiated with a laser ray. Note that whether or not the axis direction of the textured structure is a direction substantially perpendicular to the surface $S_2$ of the organic silica thin film 2 is determined as in the following manner. Specifically, consider the case of obtaining a cross-section of the organic silica thin film by scanning electron microscope (SEM) measurement and/or atomic force microscope (AFM) measurement and measuring 100 or more randomly selected axis directions of the textured structure. When any of the axis directions of the texture is substantially perpendicular (90°±30°, more preferably 90°±20°) to the surface opposite to the surface having the textured structure formed therein, it is possible to make a determination that the axis direction of the textured structure is substantially perpendicular to the surface opposite to the surface having the textured structure formed therein.

When the organic silica thin film is the porous film (has the textured structure), the average value of the distance between bump part walls is preferably 2 to 500 nm (more preferably 5 to 200 nm, further preferably 5 to 150 nm, and particularly preferably 5 to 100 nm). When such an average value of the distance between bump part walls is less than the lower limit, it tends to be difficult to introduce molecules of large molecular weight into the gaps of the texture (pore spaces) for adsorption. On the other hand, when the upper limit is exceeded, there is a tendency to fail to sufficiently obtain the effect of increasing the surface area by formation of a textured structure. Note that it is possible to obtain such an average value of the distance between bump part walls as follows. An atomic force microscope (AFM) and/or a scanning electron microscope (SEM) is used to measure the textured structure and obtain a cross-sectional view (vertical cross-sectional view) of the textured structure. For 100 or more randomly selected bump parts, the cross-sectional view is used to obtain the distance (horizontal distance) between walls of the bump part and the nearest bump part at a position where the height of the bump part is half the average bump part height to be described later (note that the height position of the bump part used for measuring the distance between walls is obtained for each bump part assuming that the height reference (height is 0 nm) is the lowest point of the dent part between that bump part and the nearest bump part). Finally, the average value thereof is calculated. Note that, when assuming that the distance between bump parts is the inter-wall distance (horizontal distance) between the nearest bump parts at a position where the height of the bump part is half the average bump part height to be described later, it is possible to measure the distance between bump parts even when the bump parts are ones having shapes with different sizes of both end portions (such as diameter and length). This makes it possible to appropriately consider the design depending on the kind of e.g. measurement target molecule introduced into the dent parts. Specifically, it is possible to use the inter-wall distance between bump parts as an index of the size of dent part gap size. Note that such a distance between bump part walls is formed in a way that the dent parts are formed of column-shaped pores, and thus can be regarded as the diameter of the pores. Therefore, it can be said that the average pore diameter of the pores of the porous film is preferably 2 to 500 nm (more preferably 5 to 200 nm, further preferably 5 to 150 nm, and particularly preferably 5 to 100 nm).

In addition, when the organic silica thin film is the porous film (has the textured structure), the average bump part height (average dent part depth) is preferably equal to or greater than the average value of the distance between bump part walls, further preferably 20 to 1500 nm, and particularly preferably 50 to 500 nm. Note that the average bump part height (average dent part depth) is more preferably in a range about the same as the film thickness T to be described later. When such an average bump part height (average dent part depth) is less than the lower limit, there is a tendency to fail to sufficiently obtain the effect of increasing the surface area by formation of a textured structure. On the other hand, if the upper limit is exceeded, it tends to be difficult to desorb and vaporize molecules adsorbed deep in the gaps (inside the pore spaces in the case of pores) to the outside of the film even when the organic silica thin film is used for mass spectrometry and irradiated with a laser ray. Note that it is possible to obtain the average bump part height (average dent part depth) mentioned here as follows. An atomic force microscope (AFM) and/or a scanning electron microscope (SEM) is used to measure the textured structure and obtain a cross-sectional view (vertical cross-sectional view) of the textured structure. For 100 or more randomly selected bump parts, the cross-sectional view is used to obtain the difference in height (distance in the vertical direction) of the top point of the bump part and the point located at the lowest position of the adjacent dent parts (lowest point of the dent parts). Finally, the average value thereof is calculated.

In addition, in such a textured structure, the average texture pitch is preferably 20 to 1000 nm, more preferably 20 to 500 nm, and further preferably 20 to 200 nm. When such an average texture pitch is less than the lower limit, it tends to be difficult to produce a textured structure with a high aspect ratio. On the other hand, when the upper limit is exceeded, there is a tendency to fail to sufficiently obtain the effect of increasing the surface area by formation of a textured structure. Such an average pitch employed is obtained as follows. An atomic force microscope (AFM) and/or a scanning electron microscope (SEM) is used to measure the textured structure and obtain a cross-sectional view (vertical cross-sectional view) of the textured structure. For 100 or more randomly selected bump parts, the cross-sectional view is used to measure the horizontal distance between the bump part top points of the bump part and the nearest bump part (the central point of the upper portion of the bump part in the case where the cross-sectional shape of the bump part is a shape such as a substantial rectangle and the upper portion of the bump part is a line containing the bump part top point). Finally, the average of the measurement values is obtained.

In addition, the thickness of such a hydrophilic thin film (thickness T illustrated in FIG. 5 in the case of an organic silica thin film having a textured structure) is preferably 20 to 2000 nm, more preferably 50 to 1000 nm, and further preferably 100 to 500 nm. When such a thickness is less than the lower limit, there is a tendency to fail to sufficiently absorb the laser ray when used as a substrate for mass spectrometry, resulting in a decrease in the efficiency of ionization and desorption of measurement target molecules (sample). On the other hand, when the upper limit is exceeded, the laser ray tends to fail to reach a deep portion of the thin film when used as a substrate for mass spectrometry, resulting in a decrease in the efficiency of ionization and desorption of measurement target molecules in the case where the measurement target molecules have been adsorbed to the deep portion.

Note that such a hydrophilic thin film (preferably an organic silica thin film) may be used as, for example, a form such as a layer stack stacked on another substrate as illustrated in FIG. 5 and FIG. 6. Such a substrate 100 is not particularly limited as long as it can support the hydrophilic thin film (preferably the organic silica thin film), and examples appropriately usable include known substrates which can be used for producing silica films, such as silicon substrates (Si substrates), quartz substrates, glass substrates, various metal substrates, and various thin films. There is no particular limitation on the form of such substrate 100, but it is preferably a flat plate shape. Note that such a substrate can be used as it is as the substrate 100 in the layer stack (multi-layer structural body) illustrated in aforementioned FIG. 5.

The method for producing such a hydrophilic thin film is not particularly limited, and known methods can be appropriately used. For example, in the case of using the hydrophilic thin film as the organic silica thin film, one may preferably use a method (I) including partially polymerizing the organic silicon compound having an organic group capable of absorbing a laser ray (more preferably one organic silicon compound selected from the compound group (A)), using a resultant sol solution to form a coating film on the substrate, and curing the coating film, to thereby obtain a hydrophilic thin film composed of an organic silica thin film. Note that, in the case of employing the method (I), it is also possible to obtain a hydrophilic thin film composed of a porous film (organic silica thin film) having a textured structure by, for example, forming a coating film using the sol solution and then, prior to curing, forming a textured structure on the coating film by nanoimprinting, and curing the film thereafter. Hereinafter, the method (I) is briefly described.

In addition, the sol solution (colloidal solution) used in the method (I) is obtained by partially polymerizing the organic silicon compound having an organic group capable of absorbing a laser ray. Except in the case of using the organic silicon compound (more preferably one organic silicon compound selected from the compound group (A)), such a sol solution may be formed by employing a known method known as a so-called sol-gel method in the field of producing silica structural bodies. Note that such a sol solution is preferably a solution containing a partial polymer obtained by subjecting the organic silicon compound to partial hydrolysis and condensation reaction. The solvent used in such a solution is not particularly limited and a known solvent used in the so-called sol-gel method can be appropriately used, and examples thereof include organic solvents such as methanol, ethanol, n-propanol, isopropanol, acetone, tetrahydrofuran, N,N-dimethylformamide, 1,4-dioxane, and acetonitrile. Among such solvents, n-propanol, isopropanol, 1,4-dioxane, and tetrahydrofuran are preferable from the viewpoint of volatility around room temperature and high solubility of the organic compound.

In addition, in the preparation of such a sol solution, there is no particular limitation on the various conditions for partially polymerizing the organic silicon compound (temperature and reaction time). Depending on the type of organic silicon compound used, for example, the reaction temperature may be about 0 to 100° C. and the reaction time may be about 5 minutes to 24 hours. In addition, it is preferable to use an acid catalyst from the viewpoint of efficiently promoting such partial polymerization. Examples of such an acid catalyst include mineral acids such as hydrochloric acid, nitric acid, and sulfuric acid.

The employed method for preparing such a sol solution may be a method for preparing a sol solution by, for example, preparing a solution containing the organic silicon compound, the solvent, and the acid catalyst and stirring the solution at room temperature (20 to 28° C., preferably 25° C.) for about 0.5 to 12 hours to partially polymerize the organic silicon compound (partial hydrolysis and partial polycondensation). Consider the case of stirring and reacting as described above. When the stirring time is less than the lower limit, there is a tendency that the hydrolysis reaction of silyl groups becomes insufficient, making difficult the progress of the curing reaction of the film after the film formation.

Note that the sol solution may be allowed to further contain other organic silicon compound than the organic silicon compound described above (for example, tetraalkoxysilanes such as tetramethoxysilane, tetraethoxysilane, and tetrabutoxysilane) as long as the organic silica thin film finally obtained can satisfy the aforementioned conditions.

In addition, regarding the sol solution, the content of the organic silicon compound in the solvent is preferably 0.2 to 20% by mass and more preferably 0.5 to 7% by mass. When the content of such an organic silicon compound is less than the lower limit, it tends to be difficult to produce a uniform film while controlling the thickness. On the other hand, when the upper limit is exceeded, it tends to be difficult to control the reaction in the sol solution, making it difficult to prepare a stable sol solution.

Moreover, regarding the sol solution, the content of the organic silicon compound in the solvent is preferably 2 to 200 g/L and more preferably 5 to 70 g/L. When the content of such an organic silicon compound is less than the lower limit, it tends to be difficult to produce a uniform film while controlling the thickness. On the other hand, when the upper limit is exceeded, it tends to be difficult to control the reaction in the sol solution, making it difficult to prepare a stable sol solution.

In addition, after the formation of the organic silicon compound by partial polymerization, such a sol solution is preferably used for film formation after filtration with a membrane filter or the like from the viewpoint of preventing contamination during production and ensuring higher smoothness.

In addition, there is no particular limitation on the method for forming the coating film obtained from the sol solution, and suitably employed is a method in which the sol solution is cast into a mold or a method in which the sol solution is coated on the substrate by various coating methods. Moreover, as such a coating method, it is possible to appropriately employ a known method (for example, a coating method using a bar coater, a roll coater, a gravure coater, or the like, or a method such as dip coating, spin coating, or spray coating).

In addition, the thickness of the film (uncured or semicured) obtained from such a sol solution is preferably 0.1 to 100 µm and more preferably 0.1 to 25 µm. When such a film thickness is less than the lower limit, it tends to be difficult to keep the film thickness evenly over the entire surface of the substrate. On the other hand, when the upper limit is exceeded, there is a tendency that unevenness easily produces in the film thickness due to flow and liquid dripping.

In addition, depending on the type of the organic silicon compound used, one may appropriately employ such conditions for the method for curing a coating film that allow progress of its hydrolysis and condensation reaction. Although there is no particular limitation on the temperature, heating time, and the like, it is preferable to carry out heating at a temperature of about 25 to 150° C. for about 1 to 48 hours. Such heating makes it possible to further advance the hydrolysis and condensation reaction of the organic silicon compound and/or a partial polymer of the organic silicon compound, and this makes it possible to cure the coating film obtained from the sol solution to form a hydrophilic thin film composed of the organic silica thin film. Note that, in order to allow the hydrolysis of the remaining alkoxy groups and the curing of the thin film to more efficiently proceed, the curing step preferably includes exposing the coating film to a vapor of hydrochloric acid for about 1 to 48 hours while heating in the above temperature range (25 to 150° C.). Such exposure to the vapor of hydrochloric acid makes it possible to promote reaction not only on the surface of the coating film but also on the inside, and to allow the hydrolysis of the remaining alkoxy groups and the curing of the thin film to more efficiently proceed.

Note that, in the method (I), it is also possible to obtain a hydrophilic thin film composed of a porous film (organic silica thin film) having a textured structure by forming a coating film using the sol solution as described above and then, prior to curing, forming a textured structure on the coating film by nanoimprinting, and curing the film thereafter.

Consider the case of employing a nanoimprinting step (step of forming a textured structure by nanoimprinting followed by curing) in the method (I). The film obtained from the sol solution is preferably a film from which the solvent has been removed (which may be a film subjected to the treatment for removing the solvent or a film obtained by using a volatile solvent to volatilize (remove) the solvent in the coating step) so as to minimize in the nanoimprinting step the influence of structural contraction due to evaporation of the solvent. Note that, in the coating film obtained from such a sol solution, there is a case where the solvent is almost evaporated (volatilized) in the step of forming a film (coating step and the like) depending on the type of the solvent of the sol solution. In that case, it is possible to minimize the influence of structural contraction due to evaporation (volatilization) of the solvent even without a particular treatment of removing the solvent. In addition, as the "nanoimprinting" mentioned here, it is possible to appropriately employ a known technique known as a so-called nanoimprinting method, and it is possible to appropriately employ a method (nanoimprinting method) in which a mold (nanostructural body) having a fine textured pattern formed therein is used to transcribe the mold pattern.

As a mold used for such nanoimprinting, a mold usable in a known nanoimprinting method can be appropriately used, and a commercially available product may be used. In addition, as such a mold (nanostructural body), anything can be appropriately used as long as a desired textured structure is formed, including a nanostructural body having a fine textured pattern formed therein.

As a mold used for such nanoimprinting, preferable is one having such a textured structure that the axis direction of the textured structure of the organic silica thin film formed is a direction substantially perpendicular to the surface opposite to the surface of the organic silica thin film having a textured structure formed therein. Use of such a mold makes it possible to transcribe the characteristics of the mold and to efficiently produce an organic silica thin film having such a textured structure that the axis direction of the textured structure is a direction substantially perpendicular to the surface opposite to the surface of the thin film having the textured structure formed therein. For example, consider the case of using as a mold a flat plate having a textured structure formed therein. When the textured structure of the mold is such that the axis direction of the textured structure is a direction substantially perpendicular to the surface opposite to the surface of the flat plate having the textured structure formed therein, it is possible to more efficiently achieve a situation where, when the textured pattern of the mold is transcribed, the axis direction of the textured structure formed in the organic silica thin film is a direction substantially perpendicular to the surface opposite to the surface of the organic silica thin film having a textured structure formed therein. Note that the textured structure of the mold used in such nanoimprinting is preferably a textured structure formed of the pillar array in which the bump parts are formed of column-shaped bodies and the column-shaped bodies are arranged.

In addition, the employed method for forming a textured structure by nanoimprinting followed by curing is preferably a method in which a mold is mounted on the surface of a film (which may be a coating film of sol solution (uncured or semi-cured), a film obtained by subjecting the coating film of sol solution to the treatment for removing the solvent (uncured or semi-cured), and the like) obtained from the sol solution so as to transcribe (invert) the characteristics of the texture formed in the mold, and then the film obtained from the sol solution is heated for curing with the mold mounted thereon. Note that, after removing the mold from the thin film cured by heating as described above, the thin film may be exposed to the vapor of hydrochloric acid from the viewpoint of allowing the hydrolysis of the alkoxy groups remaining in the thin film and the curing of the thin film to more sufficiently proceed. As described above, it is possible by nanoimprinting to efficiently form the porous film, which can be used as the hydrophilic thin film.

(Water-Repellent Thin Film)

The water-repellent thin film according to the present invention is a water-repellent thin film comprising surface-hydrophobized nanoparticles and being stacked in a region other than a region to be a sample spot on a surface of the hydrophilic thin film, wherein a water contact angle of the water-repellent thin film is 120° or more.

As described above, the water-repellent thin film in the present invention is not stacked on the region to be the sample spot (region for placing (supporting) the sample) on the surface of the hydrophilic thin film, but is stacked only on the region other than the region to be the sample spot (region on the periphery of the region to be the sample spot on the surface of the hydrophilic thin film). Therefore, the sample spot (region for placing (supporting) the sample on the surface of the hydrophilic thin film) is a partial region on the surface of the hydrophilic thin film on which the water-repellent thin film is stacked, the partial region being exposed to the outside through the opening of the water-repellent thin film. Thus, the sample spot is a region whose periphery is covered by the water-repellent thin film. Such a stack structure not only enables the sample solution to be brought into direct contact with the sample spot on the surface of the hydrophilic thin film through the opening of the water-repellent thin film, but also allows the sample to be selectively placed on the sample spot while retaining the sample solution.

The surface-hydrophobized nanoparticles forming such a water-repellent thin film are not particularly limited as long as they are composed of nanoparticles whose surface has been hydrophobized (nanoparticles having hydrophobic groups introduced on their surface). However, among them, from the viewpoint of easiness of synthesis and long-term storage stability, surface-hydrophobized silica nanoparticles (surface-hydrophobized silica nanoparticles having hydrophobic groups introduced on their surface) are more preferable. Note that examples of those hydrophobic groups include, but are not particularly limited to, preferably alkyl groups, fluorinated alkyl groups (such as trifluoroalkyl groups or perfluoroalkyl groups), alkyl chloride groups, and alkyl bromide groups, among which fluorinated alkyl groups are more preferable. By using such surface-hydrophobized silica nanoparticles, the water contact angle of the water-repellent thin film can be more efficiently set to be 120° or more.

Surface-hydrophobized silica nanoparticles suitable as such surface-hydrophobized nanoparticles can be obtained by hydrophobizing the surface of silica nanoparticles. Those silica nanoparticles (particles before hydrophobization) are not particularly limited, and known silica nanoparticles can be appropriately used. In addition, as such silica nanoparticles, one may use silica nanoparticles having a porous structure (one may use, for example, mesoporous silica nanoparticles having a large number of mesopores having a diameter of 2 to 50 nm). The method for preparing such silica nanoparticles is not particularly limited either, and a known method can be appropriately employed. For example, one may employ a method for preparing nanoparticles by hydrolyzing and condensing a metal alkoxide having silicon as a metal atom such as a tetraalkoxysilane, a trialkoxysilane, or a dialkoxysilane. In addition, in the case of converting such nanoparticles to silica nanoparticles having a porous structure, one may employ, for example, a method for preparing mesoporous silica nanoparticles by hydrolyzing and condensing the metal alkoxide in the presence of a surfactant. Examples of such surfactant include alkyl ammonium halides having long-chain alkyl groups having 8 to 26 carbon atoms, among which alkyl trimethyl ammonium halides having long-chain alkyl groups having 9 to 26 carbon atoms such as tetradecyl trimethyl ammonium halides, hexadecyl trimethyl ammonium halides, and octadecyl trimethyl ammonium halides are preferable, tetradecyl trimethyl ammonium halides and hexadecyl trimethyl ammonium halides are more preferable, and tetradecyl trimethyl ammonium chloride or hexadecyl trimethyl ammonium chloride are particularly preferable. Note that, as a method for preparing such silica nanoparticles, it is possible to appropriately use known methods such as the method for producing mesoporous silica nanoparticles described in Japanese Unexamined Patent Application Publication No. 2016-95498. Moreover, as the silica nanoparticles before hydrophobization treatment, one may appropriately use commercially available ones.

In addition, the hydrophobization which can be preferably employed is, for example, a method including bringing the nanoparticles into contact with a hydrophobization material having hydrophobic groups (coupling agent or the like having hydrophobic groups), to thereby introduce hydrophobic groups derived from the hydrophobization material onto the surface of the nanoparticles. The hydrophobization material (coupling agent or the like having hydrophobic groups) is not particularly limited as long as it is a material capable of introducing hydrophobic groups on the surface of the nanoparticles. It is possible to preferably use, for example, a silane compound containing hydrophobic groups, such as fluorinated alkyltrialkoxysilanes (such as trimethoxy(1H,1H,2H,2H-nonafluorohexyl)silane and triethoxy(1H,1H,2H,2H-tridecafluorooctyl)silane), trifluoroalkyl dialkyl chlorosilanes (such as trifluoropropyl dimethyl chlorosilane), trialkylchlorosilanes (such as trimethylchlorosilane, triethylchlorosilane, and tripropylchlorosilane), and (heptadecafluoro-1,1,2,2-tetrahydrodecyl)dimethylchlorosilane. In addition, as the hydrophobization material, it is possible to preferably use not only the above-described silane compounds containing hydrophobic groups, but also, for example, titanium compounds containing hydrophobic groups such as tetrakis(trimethylsiloxy)titanium; and aluminum compounds containing hydrophobic groups such as aluminum alkyl acetoacetate diisopropoxides. The hydrophobization is not particularly limited, and it is possible to appropriately use a known method (for example, a method of hydrophobizing nanoparticles described in JP 2016-95498 A). Note that the hydrophobization conditions are not particularly limited, and may be such that a hydrophobization material having hydrophobic groups is reacted on the surface of the nanoparticles to allow introduction of hydrophobic groups. Depending on the type of the hydrophobization material to be used, one may heat or use an acid, if necessary.

In addition, the "nanoparticles" in the surface-hydrophobized nanoparticles mentioned here mean particles having an average particle diameter (average diameter) of 20 to 1000 nm. In addition, the average particle diameter (average diameter) of the surface-hydrophobized nanoparticles is more preferably 50 to 500 nm. When the average particle diameter is less than the lower limit, there is a tendency that the particles themselves may be desorbed from the substrate due to heat or the like and vaporized, or, when stacked on the hydrophilic thin film, a sufficient textured structure due to the arrangement of particles cannot be obtained, making it difficult to obtain high water repellency. On the other hand, when the average particle diameter exceeds the upper limit, there is a tendency that the particles fall off from the hydrophilic thin film due to the weight of the particles themselves, making it impossible to sufficiently cover the region around the sample spot with the water-repellent thin film. Note that the average particle diameter can be obtained by, for example, observing the particles with a scanning electron microscope (SEM), determining the diameters (particle diameters) of 100 or more randomly extracted particles, and averaging the diameters of the particles. Note that the "diameter (particle diameter)" of a particle mentioned here refers to, when the particle is in the shape of a true sphere, the diameter of the sphere, and refers to, when the particle is not in the shape of a true sphere (when the shape of the particle in the SEM image is not a true circle), the size of the diameter of the largest circumscribed circle of the cross-section of the particle.

Moreover, the thickness of the water-repellent thin film comprising surface-hydrophobized nanoparticles is preferably a thickness of 3 times or more the average particle diameter of the nanoparticles used and a thickness of 10 μm or less (more preferably 100 nm to 8 μm and further preferably 200 nm to 5 μm). When the thickness is less than the lower limit, there is a tendency that a sufficient textured structure due to the particles is not formed on the surface of the water-repellent thin film, lowering the water repellency. On the other hand, when the upper limit is exceeded, there is a tendency that the particle aggregates themselves tend to fall off from the substrate due to the influence of gravity or the like, making it impossible to more sufficiently cover the region around the sample spot with the water-repellent thin film.

The water-repellent thin film comprising surface-hydrophobized nanoparticles is a thin film having a water contact angle of 120° or more. When the contact angle is less than the lower limit, the water repellency is not always sufficient. Therefore, when the sample plate is coated with the sample solution to place (support) the sample, the sample solution cannot be removed from the surface of the water-repellent thin film because the sample solution spilled from the sample spot remains on the surface of the water-repellent thin film or the sample solution exudes from the sample spot. As a result, it is impossible to place the sample sufficiently uniformly and selectively at a predetermined position (sample spot). In addition, the water contact angle of the water-repellent thin film is more preferably 130° or more and further preferably 150° or more from the viewpoints that the water-repellent thin film has higher water repellency and that, when the sample plate is coated with the sample solution to place (support) the sample, it is possible to support the sample more efficiently and more uniformly in the sample spot. In addition, such a water contact angle can be easily achieved by forming a thin film using the surface-hydrophobized nanoparticles. Specifically, when a thin film is formed using the surface-hydrophobized nanoparticles, the hydrophobic nanoparticles are multi-stacked, and the particles spontaneously form a textured structure of nanoscale to micron scale size. When such a textured structure is formed, a hydrophobic air layer is efficiently formed on the surface and the hydrophobicity of the thin film is enhanced, making it possible to exhibit higher water repellency. Thus, it is also possible to exhibit high water repellency (preferably super water repellency such that the water contact angle is 150° or more) which is difficult to exhibit with an ordinary smooth substrate or smooth film subjected to hydrophobization. Then, such high water repellency makes it possible to sufficiently prevent the exudation or the like of the sample solution when the sample plate is coated with the sample solution to place (support) the sample, and moreover to easily return the sample solution to the right position (sample spot) even when the solution is deposited at a position deviated from the sample spot. Therefore, it is possible to sufficiently uniformly support the sample on the sample spot.

The method for preparing a water-repellent thin film comprising surface-hydrophobized nanoparticles is not particularly limited. It is possible to employ, for example, a method including coating a dispersion liquid, formed by dispersing the surface-hydrophobized nanoparticles in a volatile solvent (for example and an alcohol), only on the region other than the region to be a sample spot on the surface of the hydrophilic thin film, removing the solvent, and thereby obtaining a thin film comprising surface-hydrophobized nanoparticles. There is no particular limitation on the method for coating the dispersion liquid which can be employed for producing such a thin film, and any known method can be employed as appropriate. It is possible to employ, for example, a method including placing, on a region to be a sample spot on the surface of the hydrophilic thin film, a mask material having the same shape as the pattern of that region (for example, a metal cone or the like), thereby masking the sample spot, and then coating the dispersion liquid. In addition, the specific coating method is not particularly limited, and it is possible to appropriately employ known methods which can coat a dispersion liquid. For example, it is possible to appropriately employ known coating methods such as the direct coating method, spray coating, and ink jet printing. Note that the shape of the sample spot thus formed (the pattern shapes of the hydrophobic region formed by the water-repellent thin film and the hydrophilic region (sample spot) on the surface of the sample plate) is not particularly limited. Depending on the type of the sample solution, the type of the measuring apparatus, and the like, the shape and size of the hydrophilic region (region to be the opening of the water-repellent thin film) can be appropriately designed such that the region has an area suitable for coating the sample solution (aqueous solution) at the time of analysis (so that the region supporting the sample is an area suitable for analysis). Note that, in general laser desorption/ionization mass spectrometry, the sample is often supported on the sample spot using a sample solution (aqueous solution) of about 1 μL in consideration of work efficiency and the like. For this reason, the sample spot to be a hydrophilic region is preferably formed as a circular spot having a diameter of 50 to 2000 μm (more preferably 100 to 1000 μm).

Note that, since the water-repellent thin film is made of the surface-hydrophobized nanoparticles, it is possible to pattern a hydrophilic region and a hydrophobic region in a very simple manner such as partial coating of the particles. As described above, in the present invention, a simple method as described above can be used for the production of the water-repellent thin film based on the configuration thereof. Therefore, it is also possible to easily achieve the increase in area of the sample plate and the cost reduction in the production thereof.

(On Laser Desorption/Ionization Mass Spectrometry etc. Using Sample Plate)

The sample plate of the present invention is used as an analysis substrate for laser desorption/ionization mass spectrometry, and includes a hydrophilic thin film capable of absorbing a laser ray and a water-repellent thin film comprising surface-hydrophobized nanoparticles and being stacked in a region other than a region to be a sample spot on a surface of the hydrophilic thin film, wherein a water contact angle of the water-repellent thin film is 120° or more. Note that, as the hydrophilic thin film having a water-repellent thin film stacked thereon, one may use one supported on a substrate as described above. In this case, the sample plate obtained is a layer stack having a stack structure in which the substrate, the hydrophilic thin film, and the water-repellent thin film are sequentially stacked.

The method of laser desorption/ionization mass spectrometry which uses such a sample plate is not particularly limited, but is preferably a method including using the sample plate for laser desorption/ionization mass spectrometry of the present invention as an analysis substrate, coating the sample spot of the sample plate with a solution of the sample (sample containing the measurement target molecules) to place (support) the sample, and then irradiating the sample supporting portion (sample spot) with a laser ray to ionize the measurement target molecules, to thereby perform mass spectrometry. Hereinafter, such mass spectrometry is briefly described.

Note that, as in the mass spectrometry described above, it becomes possible to more efficiently ionize the measurement target molecules by using the sample plate for laser desorption/ionization mass spectrometry of the present invention as an analysis substrate. In this respect, the present inventors presume as described below. First, when the hydrophilic thin film (preferably the organic silica thin film) according to the present invention is irradiated with a laser ray, the film absorbs the laser ray (for example, when the hydrophilic thin film is the organic silica thin film, the organic group absorbs the laser ray). When the laser ray is absorbed by the hydrophilic thin film in this way, it becomes possible to transfer the absorbed optical energy to the measurement target molecules (energy receptors) supported on the film. Therefore, when irradiated with a laser ray, the hydrophilic thin film (preferably the organic silica thin film) is considered to act as an energy supplier which absorbs optical energy and transfers the energy to the measurement target molecules (energy receptors). Such energy transfer from the hydrophilic thin film (energy supplier) to the measurement target molecules (energy receptors) is conceivably energy transfer not via light emission (for example, transfer of excited energy between molecules, electron transfer, or transfer as thermal energy) and energy transfer via light emission (for example, energy transfer caused when the measurement target molecules absorb the light emitted from the organic groups constituting the structure of the portion for absorbing a laser ray in the hydrophilic thin film (energy transfer by light emission reabsorption)). Then, the present inventors presume that such energy transfer makes it possible to more efficiently ionize the measurement target molecules by using a laser ray.

In addition, as the sample to be subjected to mass spectrometry, it is possible to use a sample containing measurement target molecules. Although such measurement target molecules are not particularly limited, they are preferably molecules derived from a living body or molecules in a living body sample because the present invention enables measurement with higher detection sensitivity. Such molecules derived from a living body or molecules in a living body sample are more preferably sugars, proteins, peptides, glycoproteins, glycopeptides, nucleic acids, and glycolipids. There is a tendency that higher level analysis can be performed for these molecules. In addition, such measurement target molecules may be ones prepared from natural products, ones prepared by partially modifying a natural product chemically or enzymatically, and ones prepared chemically or enzymatically. In addition, they may be ones having a partial structure of molecules contained in a living body or ones prepared by mimicking molecules contained in a living body.

In addition, the sample (sample containing the measurement target molecules) may be the measurement target molecules themselves or ones containing the measurement target molecules (such as living body tissues, cells, body fluids, and secretions (for example, blood, serum, urine, semen, saliva, tears, sweat, feces, and the like)). As described above, it is possible to directly use a living body sample as the sample (sample containing the measurement target molecules). In addition, the measurement target molecules may be prepared on the sample plate by allowing the organic silica thin film to support a precursor of the sample (such as a precursor of the measurement target molecules), followed by enzyme treatment. In this case, when the treatment is carried out after the sample precursor is supported on the sample plate, the sample is eventually supported on the organic silica thin film.

In addition, the aforementioned "measurement target molecules" may be molecules themselves which are contained in the sample and whose chemical structure is desired to be determined, or molecules which are contained in the sample and which are obtained by derivatizing the molecules whose chemical structure is desired to be determined (for example, molecules subjected to mass spectrometry, which are obtained by binding so-called labelled molecules to molecules whose chemical structure is desired to be determined). As described above, the "measurement target molecule" may be underivatized molecules or molecules derivatized with labelled molecules. Note that the presence or absence of derivatization is not particularly limited, and may be appropriately determined depending on the type of the organic group of the organic silica thin film to be used, the type of molecules whose chemical structure is desired to be determined, and the like. As described above, derivatization is not always necessary depending on the molecules whose chemical structure is desired to be determined. Note that although the molecular weight of such measurement target molecules is not particularly limited, it is preferably 160 or more, more preferably 500 or more, and particularly preferably 1000 or more because it is difficult to accurately carry out measurement by other measurement methods and it is easy to exhibit the characteristics of the present invention.

In addition, in the case of using molecules obtained by derivatizing the molecules whose chemical structure is desired to be determined as the measurement target molecules, the derivatization may be carried out by covalent bonding with labelled molecules which enable acceptance of optical energy absorbed by the hydrophilic thin film (preferably organic silica thin film) and preferably with labelled molecules having an absorption band with a spectral overlap with the light emission spectrum of the hydrophilic thin film (preferably organic silica thin film).

Such labelled molecules used are not particularly limited, and they preferably have an effect as a receptor of energy supplied from the hydrophilic thin film (preferably organic silica thin film), and may be molecules commercially available as fluorescent label reagents. Examples of such labelled molecules include pyrene derivatives, fluorescein derivatives, rhodamine derivatives, cyanine dyes, Alexa Fluor (registered trademark), 2-aminoacridone, and 6-aminoquinoline.

In addition, as described above, since the transfer of the optical energy absorbed by the hydrophilic thin film is considered to make it possible to more efficiently ionize the measurement target molecules by using a laser ray, it is preferable to select the measurement target molecules and the organic group in the organic silica thin film preferable as the hydrophilic thin film so as to satisfy the following relationships. Specifically, whatever the energy transfer (energy transfer from the organic silica thin film (energy supplier) to the measurement target molecules (energy receptors)) is, from the viewpoint of more efficiently enabling energy transfer, it is more preferable to select the organic group and the measurement target molecules such that there is at least an overlap at one certain wavelength between the optical spectrum emitted from the organic group of the organic silica thin film and the absorption spectrum of the measurement target molecules after the organic group in the organic silica thin film absorbs an irradiation laser ray. As described above, when there is at least an overlap at one certain wavelength between the light emission spectrum from the organic group and the absorption spectrum of the measurement target molecules, the optical energy absorbed by the organic silica thin film or the excited energy of the organic silica thin film tends to more efficiently transfer to the measurement target molecules. Particularly in the case of energy transfer via light emission, the organic silica thin film absorbs an irradiation laser ray to emit light, and there is more preferably at least an overlap at one certain wavelength between the light emission spectrum of the organic silica thin film (light emission spectrum from the organic group) and the absorption spectrum of the measurement target molecules. This is because the optical energy exiting the organic silica thin film by such light emission tends to efficiently transfer to the measurement target molecules.

In addition, the combination of the hydrophilic thin film (preferably the organic silica thin film), an energy supplier, and the labelled molecules, energy receptors, can be appropriately determined from the viewpoint of the efficiency of energy transfer, the overlap between the light emission spectrum of the hydrophilic thin film (preferably the organic silica thin film) and the absorption spectrum of the measurement target molecules, the intensity of interaction, and the like. For example, in the case of using a cross-linked type organic silica thin film having, in the skeleton, a triphenylamine group (organic group) as the hydrophilic thin film, it is possible to suitably use, as the labelled molecule, 2-aminoacridone and the like. In addition, in the case of using a cross-linked type organic silica thin film having, in the skeleton, a methyl acridone group (organic group) as the hydrophilic thin film, it is possible to suitably use, as the labelled molecule, 4-Fluoro-7-nitrobenzofurazan, 4-Fluoro-7-sulfobenzofurazan, 3-Chlorocarbonyl-6,7-dimethoxy-1-methyl-2(1H)-quinoxalinone, and the like. Such labelled molecules preferably have a functional group which chemically bonds easily to the target molecules, and the derivatization may be carried out in other container or on the organic silica thin film.

In addition, whatever form the energy transfer has (whether via light emission or not via light emission), there is more preferably at least an overlap at one certain wavelength between the light emission spectrum of the hydrophilic thin film (preferably the organic silica thin film) and the absorption spectrum of the measurement target molecules due to the position of the short wavelength end of the light emission spectrum of the hydrophilic thin film (preferably the organic silica thin film) located on the short wavelength side of the long wavelength end of the absorption spectrum of the measurement target molecules. In that case, the optical energy absorbed by the hydrophilic thin film (preferably the organic silica thin film) tends to more efficiently transfer in the form of optical energy or excited energy to the measurement target molecules.

In addition, the step employed in the mass spectrometry first allows the hydrophilic thin film (preferably the organic silica thin film) to support a sample containing the measurement target molecules. There is no particular limitation on such a method for supporting a sample. For example, it is preferable to employ a method which adds a sample solution dropwise to the sample spot of the hydrophilic thin film (preferably the organic silica thin film), then removes the solvent to place the sample, and thereby supports the sample in the sample spot. When the sample solution is placed on the sample spot in this way, the water-repellent thin film present on the periphery causes the solution to stay on the surface of the hydrophilic sample spot. As the solvent is removed, the solution is concentrated while spreading over the area of the sample spot. Therefore, it is possible to sufficiently uniformly support the sample while suppressing the occurrence of uneven concentration in the sample spot.

Next, in the mass spectrometry, the sample (sample containing the measurement target molecules) is supported on the sample spot of the sample plate as described above, and then the sample supporting portion (sample spot) is irradiated with a laser ray to ionize the measurement target molecules. In this way, mass spectrometry is performed.

Examples of a laser ray source used in such mass spectrometry include, but not limited to, laser ray sources such as nitrogen lasers (337 nm), YAG laser third harmonic waves (355 nm), Nd YAG lasers (256 nm), and carbon dioxide gas lasers (9400 nm, 10600 nm). Among those laser ray sources, laser ray sources of nitrogen lasers and YAG laser third harmonic waves are preferable from the viewpoint that, in the case where the structure of the portion for absorbing a laser ray in the hydrophilic thin film is composed of the organic group, it is possible to irradiate the organic group with a laser ray of a wavelength that makes it possible to more efficiently absorb light. Such a laser ray source (for example, a source of nitrogen laser) is used to irradiate the sample supporting portion (sample spot) with a laser ray. This makes it possible to ionize the measurement target molecules. Note that the present inventors presume the mechanism of ionization is, as already described, such that the hydrophilic thin film absorbs the irradiation laser at the laser irradiation site, and the absorbed optical energy efficiently transfers to the measurement target molecules.

In addition, the laser ray irradiation conditions (irradiation intensity, irradiation time, and the like) are not particularly limited, and optimum conditions may be appropriately selected from known mass spectrometry conditions and set depending on the measurement target molecules. In addition, an ion separation detection method for mass spectrometry is not particularly limited, and it is possible to appropriately employ the double focusing method, the quadrupole focusing method (quadrupole (Q) filter method), the tandem quadrupole (QQ) method, the ion trap method, the time of flight (TOF) method, and the like. These make it possible to separate and detect ionized molecules according to the mass/charge ratio (m/z). Note that it is possible to appropriately use a commercially available apparatus for such separation and detection of ions, and examples thereof which can be appropriately used include a mass spectrometer manufactured by Bruker Daltonics (trade name "autoflex" and the like) and an ion trap time-of-flight type mass spectrometer manufactured by Shimadzu Corporation (trade name "AXIMA-QIT" and the like). In this way, it is possible to carry out mass spectrometry on ionized measurement target molecules.

Note that, in the mass spectrometry as described above, it is possible to perform mass spectrometry by efficiently ionizing the measurement target molecules by use of the sample plate for laser desorption/ionization mass spectrometry of the present invention as an analysis substrate. For this reason, it is not always necessary to use a sample formed by mixing the measurement target molecules (analysis target compound) with a matrix compound (low molecular organic substance) (addition of the matrix compound can be made unnecessary, and an option not to use a matrix compound in mass spectrometry is provided). Therefore, it is possible to measure the peak derived from the measurement target molecules without detecting the peak derived from the matrix. Also from this viewpoint, the present inventors speculate that it is possible to carry out more accurate mass spectrometry.

EXAMPLES

Hereinafter, the present invention is described more specifically based on Examples and Comparative Example, but the present invention is not limited to the following examples.

Preparation Example 1

Preparation of Raw Material Compound for Preparing Hydrophilic Thin Film

First, N-[2-(2-methoxyethoxy)ethyl]-1,8-naphthalimide (1.0 g, 3.36 mmol) and $RuH_2(CO)(PPh_3)_3$ (82.5 mg, 0.09 mmol), and mesitylene (20 mL) were mixed under nitrogen atmosphere, and the resultant mixture solution was heated to 100° C. to obtain a uniform solution. Then, triisopropyloxyvinylsilane (4.18 g, 4.81 mL, 18.0 mmol) was added to the solution, and then the mixture was heated and stirred at 160° C. for 3 hours to obtain a reaction solution. Then, the reaction solution was cooled to room temperature and then purified by neutral silica gel column chromatography (developing solvents: used while changing in the following order (1) to (3): (1) chloroform/hexane (volume ratio: 1/1 (v/v)), (2) chloroform/hexane (volume ratio: 2/1 (v/v)), (3) chloroform only) to recover a fraction containing the desired product. Next, the solvent was removed from the recovered fraction with a rotary evaporator. Thereafter, the resultant was vacuum-dried while being heated at 60° C. to obtain a compound represented by the following formula (A) (N-[2-(2-methoxyethoxy)ethyl]-2,7-bis[2-(triisopropoxysilyl)ethyl]-1,8-naphthalimide):

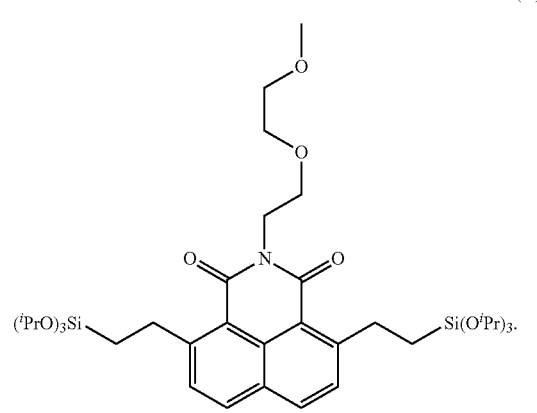

(viscous liquid, yield amount 2.60 g, yield rate 100%)

To identify the structure of the compound thus obtained, measurement of $^1$H NMR and $^{13}$C NMR spectra was carried out. Note that, in the measurement of $^1$H NMR and $^{13}$C NMR spectra, deuterated chloroform was used as a solvent, and a measuring apparatus under the trade name of "JNM-ECX400P" manufactured by JEOL Ltd was used. The obtained results are presented below.

$^1$H NMR (CDCl$_3$, σ in ppm): 1.06 (m, 4H; —CH$_2$—Si), 1.24 (d, J=6.2 Hz, 36H; Si—O—CH(CH$_3$)$_2$), 3.35 (s, 3H; —OCH$_3$), 3.49 (m, 4H; Ar—CH$_2$—), 3.52 (m, 2H), 3.73 (m, 2H), 3.81 (m, 2H), 4.32 (sep, J=6.2 Hz, 6H; Si—O—CH(CH$_3$)$_2$), 4.45 (m, 2H), 7.53 (d, J=8.3 Hz, 2H; Ar—H), 7.98 (d, J=8.3 Hz, 2H; Ar—H).

$^{13}$C NMR (CDCl$_3$, σ in ppm): 13.4, 25.6, 30.2, 38.6, 59.0, 65.0, 68.1, 69.7, 72.0, 118.4, 129.3, 130.39, 130.43, 133.3, 153.4, 163.8.

From the measurement results of the $^1$H NMR and $^{13}$C NMR spectra, it was revealed that the compound obtained in Synthesis Example 1 was a compound represented by the formula (A) (N-[2-(2-methoxyethoxy)ethyl]-2,7-bis[2-(tri-isopropoxysilyl)ethyl]-1,8-naphthalimide). Note that, in the following, the compound represented by the formula (A) is sometimes referred to simply as the "compound (I)."

Preparation Example 2

Preparation of Dispersion Liquid of Surface-Hydrophobized Nanoparticles (A)

Silica nanoparticles having an average particle diameter of 150 nm (manufactured by NIPPON SHOKUBAI CO., LTD. under the trade name of "KE-P15," 0.25 g) and trimethoxy (1H,1H,2H,2H-nonafluorohexyl)silane (0.4 g) were sealed in a container made of polytetrafluoroethylene, and heated at 150° C. for 6 hours to perform surface treatment (surface hydrophobization treatment) of the silica nanoparticles. Next, the surface-treated silica nanoparticles were cooled to room temperature and then removed from the container. Next, the removed particles were subjected to a vacuum drying treatment performed under the conditions of pressure: 9.3 Pa and temperature: 120° C. for 5 hours. Thereafter, the surface-treated silica nanoparticles thus obtained (hereinafter referred to as the "surface-hydrophobized silica nanoparticles (A)") were added with ethanol (4.75 g) to prepare an ethanol dispersion liquid (dispersion liquid of the particles (A)) containing surface-hydrophobized silica nanoparticles (A) in a proportion of about 5% by mass.

Preparation Example 3

Preparation of Dispersion Liquid of Surface-Hydrophobized Nanoparticles (B)

Surface-treated silica nanoparticles (hereinafter referred to as the "surface-hydrophobized silica nanoparticles (B)") were obtained in the same manner as that of Preparation Example 2 except that silica nanoparticles having an average particle diameter of 200 nm (manufactured by NIPPON SHOKUBAI CO., LTD. under the trade name of "KE-P20," 0.25 g) were used instead of using silica nanoparticles having an average particle diameter of 150 nm, and an ethanol dispersion liquid (dispersion liquid of the particles (B)) containing surface-hydrophobized silica nanoparticles (B) in a proportion of about 5% by mass was prepared.

Preparation Example 4

Preparation of Dispersion Liquid of Surface-Hydrophobized Porous Nanoparticles (C)

Triethanolamine (0.18 g) and an aqueous solution (60 mL) containing hexadecyltrimethylammonium chloride at a concentration of 10% by mass were placed in a 100 mL eggplant flask and stirred at 80° C. for 1 hour to obtain a mixture solution. Then, to the obtained mixture solution, a mixture of tetraethoxysilane (4 mL) and methylcyclohexane (16 mL) previously prepared separately was slowly added to form a two-phase separation state composed of organic layer/aqueous layer. Thereafter, the mixture was heated at 80° C. for 10 hours with slow stirring at a rotation speed of 150 to 200 rpm to form nanoparticles. Next, the aqueous layer containing the formed nanoparticles was separated, followed by centrifugation (4000 rpm, 1 hour) to recover the nanoparticles. Next, the recovered nanoparticles were washed three times by centrifugation using an ethanol solvent (4000 rpm, 1 hour) to finally obtain an ethanol dispersion liquid (30 mL) containing nanoparticles at a concentration of 5% by mass.

The nitrogen adsorption isotherm of the nanoparticles thus obtained was measured using a measuring apparatus manufactured by Quantachrome under the trade name of "Autosorb-1." Note that the pore diameter of the nanoparticles was calculated by the density functional method, and the pore volume was calculated by the t-plot method. The results of these measurements revealed that the obtained nanoparticles were mesoporous silica nanoparticles having a pore diameter of 4.7 nm, a pore volume of 0.37 cm$^3$/g, and a porosity of about 42%.

The dispersion liquid of mesoporous silica nanoparticles thus obtained was added with triethoxy(1H,1H,2H,2H-nonafluorohexyl)silane (0.3 g), and heated at 60° C. for 6 hours to perform surface treatment (surface hydrophobization treatment) of the mesoporous silica nanoparticles. Next, the surface-treated mesoporous silica nanoparticles thus obtained (hereinafter referred to as the "surface-hydrophobized porous silica nanoparticles (C)") were washed three times by centrifugation using an ethanol solvent (4000 rpm, 1 hour) to finally obtain a dispersion liquid (dispersion liquid of the particles (C)) containing surface-hydrophobized porous silica nanoparticles (C) at a proportion of about 5% by mass. The particles (C) were observed using a scanning electron microscope (SEM), the particle diameter was measured for each of the 100 randomly extracted particles, and then the particle diameters of the particles were averaged to confirm the average particle diameter of the surface-hydrophobized porous silica nanoparticles (C). As a result, the average particle diameter was confirmed to be 150 nm.

Example 1

A sample plate for laser desorption/ionization mass spectrometry was prepared according to the following step (I) and step (II).

<Step (I): Step of Preparing Organic Silica Thin Film>

The compound (I) (90 mg) obtained in Preparation Example 1 was dissolved in n-propanol (1.0 mL) to obtain a mixture solution. Then, 2 mol/L hydrochloric acid (12 μL) was added to the mixture solution, followed by stirring at room temperature for 30 minutes to obtain a sol solution. To the sol solution thus obtained was mixed with 2-methoxyethanol (200 μL). Then, the sol solution was spin-cast (1800 rpm, 4 seconds) on a silicon substrate to coat the silicon substrate with an organic silica thin film (uncured) having a thickness of about 250 nm. Note that, in the film (uncured organic silica thin film) obtained from the sol solution in this way, most (almost) of the solvent was evaporated (volatilized) at the time of spin coating. The silicon substrate coated with the organic silica thin film in this manner was exposed to a vapor of 6 mol/L hydrochloric acid at 80° C. for 3 hours, allowing hydrolysis of residual alkoxy groups and curing of the thin film to proceed to form an organic silica thin film (hydrophilic thin film) on the silicon substrate.

<Step (II): Step of Preparing Sample Plate>

On the surface of the organic silica thin film obtained in step (I), aluminum studs having a diameter of 1 mm were arranged at intervals of about 3 mm as a mask material. After that, the dispersion liquid of the particles (A) prepared in Preparation Example 2 (ethanol dispersion liquid of the surface-hydrophobized silica nanoparticles (A) having an average particle diameter of about 150 nm) was spray-coated to form a coating film of the dispersion liquid. Thereafter, ethanol was evaporated from the coating film and then the mask material was removed. Thus, a thin film composed of the surface-hydrophobized silica nanoparticles (A) was formed on a region other than the region where the mask material (aluminum studs) had been arranged. As a consequence, a sample plate partially coated with a thin film of surface-hydrophobized silica nanoparticles on the surface of the organic silica thin film was obtained. Note that the sample plate thus obtained uses, as a sample spot, the region on the surface of the organic silica thin film where a thin film composed of the surface-hydrophobized silica nanoparticles (A) (a thin film of surface-hydrophobized silica nanoparticles (A)) is not formed.

[Evaluation of Characteristics of Organic Silica Thin Film Formed in Step (I)]

<Measurement of Water Contact Angle of Organic Silica Thin Film>

The organic silica thin film obtained in step (I) before being subjected to step (II) above was used to measure the water contact angle of the organic silica thin film as follows. Specifically, the amount of each water droplet (purified water) brought into contact with the surface of the organic silica thin film was 0.5 µL, and water contact angles were measured at five different arbitrary positions on the surface of the thin film using, as a measuring apparatus, a contact angle meter manufactured by Kyowa Interface Science, Inc (under the trade name of "DM-501"), and the average value thereof was calculated. Thereby, the water contact angle of the organic silica thin film was obtained (average value for five arbitrary measurement points).

Figure 7:
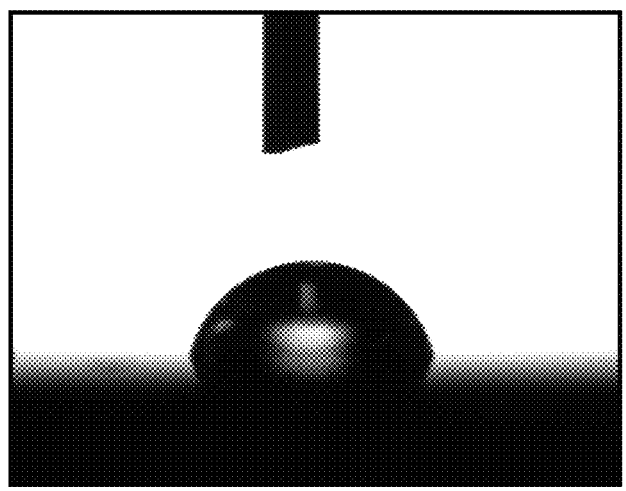
FIG. 7 is a photograph of a thin film illustrating a situation in which a water droplet at the time of measurement of the contact angle is in contact with the surface of the organic silica thin film prepared in Example 1.

FIG. 7 illustrates a photograph of the thin film in contact with a water droplet at the time of measurement of the contact angle. Note that the measurement revealed that the water contact angle of the obtained organic silica thin film was 79°. In addition, from these results (FIG. 7, the size of the contact angle, and the like), it was found that the organic silica thin film was a hydrophilic thin film.

<Measurement of Absorption Wavelength of Organic Silica Thin Film>

The organic silica thin film was formed on a quartz substrate by employing the same step as the "Step of Preparing Organic Silica Thin Film" described above except that a quartz substrate was used instead of a silicon substrate. With the organic silica thin film thus obtained (stacked on a quartz substrate) as a measurement sample, a spectrophotometer manufactured by JASCO Corporation (under the trade name of "V-670") was used as a measuring apparatus to measure the ultraviolet/visible absorption spectrum of the thin film.

Figure 8:
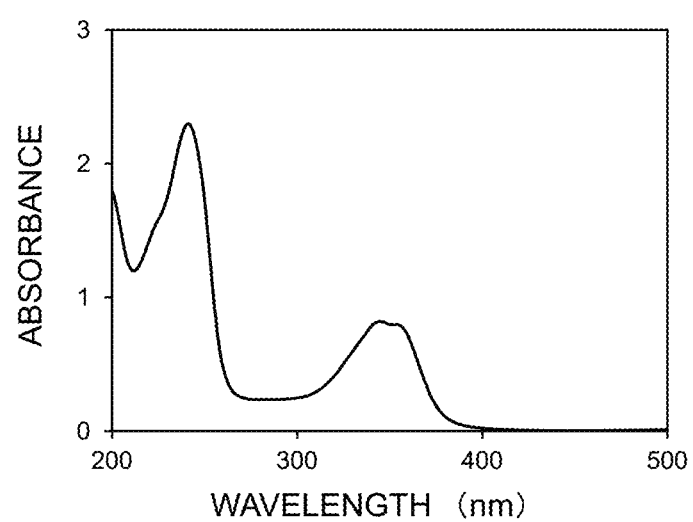
FIG. 8 is a graph illustrating the ultraviolet/visible absorption spectrum of the organic silica thin film obtained using the compound (I) represented by the formula (A).

FIG. 8 illustrates the ultraviolet/visible absorption spectrum as the measurement result of the ultraviolet/visible absorption spectrum of the organic silica thin film (sample) formed on the quartz substrate. As is apparent from the result illustrated in FIG. 8, it was revealed that the organic silica thin film formed by hydrolysis and polycondensation of the compound (I) had a strong absorption band in the vicinity of a wavelength of 340 nm. The result revealed that the obtained organic silica thin film was capable of absorbing a laser ray.

[Evaluation of Characteristics of Thin Film of Surface-Hydrophobized Silica Nanoparticles (A) Formed in Step (II)]

<Scanning Electron Microscope (SEM) Measurement of Thin Film Composed of Particles (A)>

The surface of the thin film composed of the surface-hydrophobized silica nanoparticles (A) formed in step (II) was measured with a scanning electron microscope (SEM). Note that the scanning electron microscope used was a scanning electron microscope manufactured by Hitachi High-Technologies Corporation (under the trade name of "SU3500").

Figure 9:
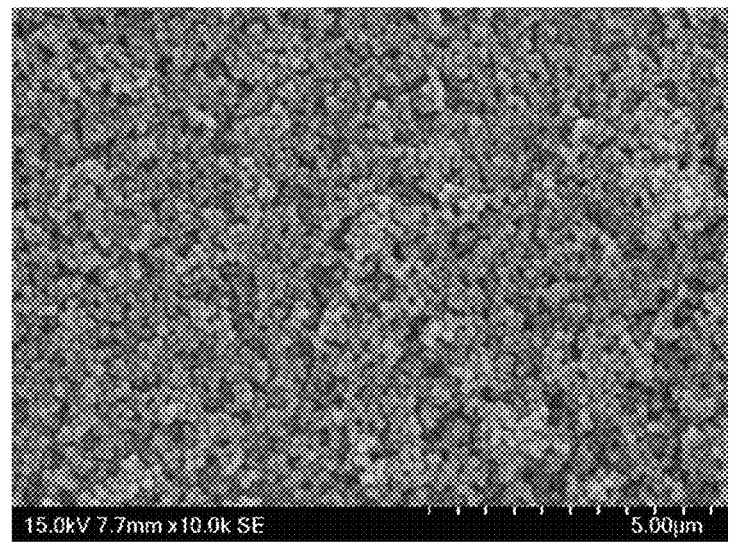
FIG. 9 is a scanning electron microscope (SEM) photograph illustrating the surface condition of the thin film composed of the surface-hydrophobized silica nanoparticles (A) prepared in Example 1.

FIG. 9 presents, as the result of the measurement, a scanning electron microscope (SEM) photograph illustrating the surface condition of the thin film composed of the surface-hydrophobized silica nanoparticles (A). As is apparent from the SEM image illustrated in FIG. 9, it was found that the thin film of surface-hydrophobized silica nanoparticles was one formed by multi-stacking of the surface-hydrophobized silica nanoparticles (A). Note that, from the SEM measurement, it was found that the thickness of the thin film composed of the particles (A) was 2 to 4 µm.

<Measurement of Water Contact Angle of Thin Film Composed of Particles (A)>

The water contact angle of the thin film composed of the surface-hydrophobized silica nanoparticles (A) was measured as the average value for five arbitrary measurement points in the same manner as that of the method employed in "Measurement of Water Contact Angle of Organic Silica Thin Film" described above except that the measurement target was the thin film composed of the surface-hydrophobized silica nanoparticles (A) formed in step (II) instead of the organic silica thin film obtained in step (I).

Figure 10:
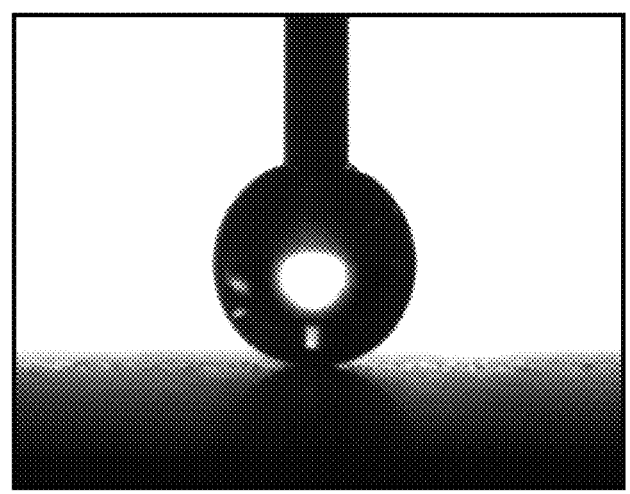
FIG. 10 is a photograph of a thin film illustrating a situation in which a water droplet at the time of measurement of the contact angle is in contact with the surface of the thin film composed of the surface-hydrophobized silica nanoparticles (A) prepared in Example 1.

FIG. 10 illustrates a photograph of the thin film in contact with a water droplet at the time of measurement of the contact angle. Note that the measurement revealed that the water contact angle of the thin film composed of the surface-hydrophobized silica nanoparticles (A) was 150° or more. From these results (FIG. 10, the size of the contact angle, and the like), it was found that the thin film composed of the surface-hydrophobized silica nanoparticles (A) was a thin film exhibiting high water-repellency (super water repellency).

[Evaluation of Characteristics of Sample Plate Obtained in Example 1]

The sample plate obtained in Example 1 was used as a substrate for analysis used in laser desorption/ionization mass spectrometry to perform laser desorption/ionization mass spectrometry (LDI-MS) as described below.

Figure 11:
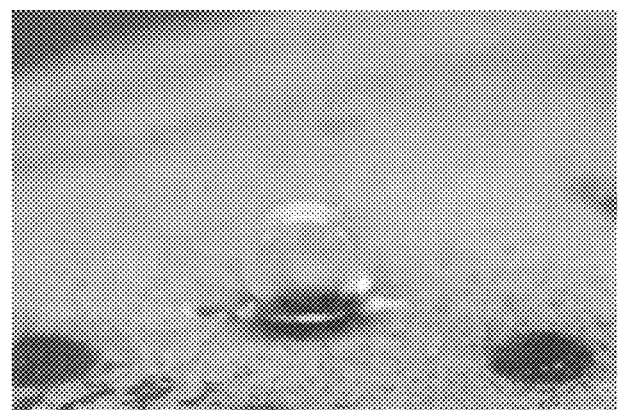
FIG. 11 is a photograph of a thin film illustrating a situation on the surface of a sample plate (thin film) when an aqueous solution of angiotensin I is coated on the sample plate obtained in Example 1.

First, angiotensin I was selected as a measurement target molecule to prepare an aqueous solution of angiotensin I (concentration of angiotensin I: 1 pmol/µL, containing 0.1% by mass of trifluoroacetic acid). Next, the aqueous solution of angiotensin I in an amount of 1.5 µL was added dropwise to the sample spot (region where the thin film of the surface-hydrophobized silica nanoparticles (A) was not formed) of the sample plate obtained in Example 1, thereby coating the region with the aqueous solution of angiotensin I (sample solution). FIG. 11 presents a photograph of the situation (fine hydrophilic/hydrophobic (water-repellent) pattern) on the surface of the sample plate (thin film) when the aqueous solution was coated. From the photograph illustrated in FIG. 11, it was revealed that the aqueous solution of angiotensin I remained on the sample spot of the sample plate (thin film) and that no exudation and the like from the sample spot occurred, and it was found that only the exposed portion of the organic silica thin film (sample spot) was selectively coated with the sample solution.

Then, the sample plate after coating with the aqueous solution of angiotensin I (sample solution) was allowed to dry naturally, and angiotensin I (sample) was supported on the sample spot. Then, in the sample spot supporting angiotensin I (site coated with the sample solution), five different regions arbitrarily selected (five different circular regions with a diameter of 50 µm in a circular sample spot with a diameter of 1 mm) were set as measurement points. A mass spectrometer manufactured by Bruker Daltonics (MALDI-TOF-MS apparatus under the trade name of "Autoflex") was used as an analyzer to irradiate each measurement point with an $N_2$ laser (wavelength: 337 nm), to thereby perform mass spectrometry in the reflectron mode. Note that the $N_2$ laser was cumulated and irradiated ten times on each of the five arbitrary measurement points in the sample spot under a condition of a laser intensity of 30% (50 shots in total).

Figure 12:
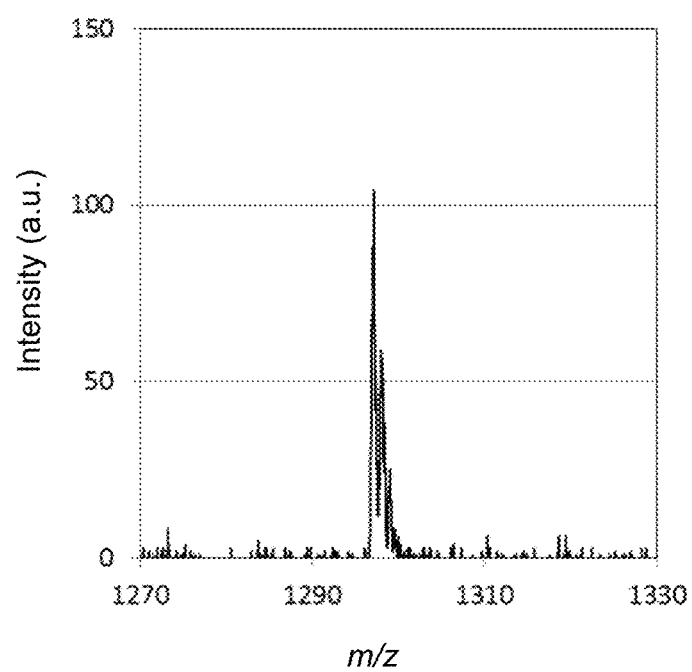
FIG. 12 is a graph of a mass spectrum (LDI-MS spectrum) obtained as a result of mass spectrometry using the sample plate obtained in Example 1.

FIG. 12 illustrates a graph of the LDI-MS spectrum of one measurement point as a result of the mass spectrometry. As is apparent from the analysis result illustrated in FIG. 12 (graph of the LDI-MS spectrum), it has been found from the above-described mass spectrometry that the signal derived from angiotensin I (m/Z=1297) is clearly confirmed. Also in the LDI-MS spectra of the remaining four measurement points, a signal derived from angiotensin I having almost the same intensity as the spectrum illustrated in FIG. 12 was confirmed. From the above results, it has been found that, when the sample plate obtained in Example 1 is used as a substrate for analysis used in laser desorption/ionization mass spectrometry, it is possible to reproducibly perform accurate mass spectrometry in which a signal of the sample can be clearly confirmed.

Example 2

A sample plate for laser desorption/ionization mass spectrometry was prepared in the same manner as that of Example 1 except that step (I) was not performed and that an organic silica thin film having a textured structure obtained by the "Step of Preparing Organic Silica Thin Film Having Textured Structure" to described later was used instead of the organic silica thin film obtained in step (I). As described above, in Example 2, the organic silica thin film having a textured structure obtained by the step to described later was subjected to step (II) to stack a thin film partially composed of the surface-hydrophobized silica nanoparticles (A) on the surface of the organic silica thin film having a textured structure, thereby preparing a sample plate for laser desorption/ionization mass spectrometry.

<Step of Preparing Organic Silica Thin Film Having Textured Structure>

First, a method employed in step (I) of Example 1, same as the method for coating a silicon substrate with an organic silica thin film (uncured) having a thickness of about 250 nm, was employed to coat a silicon substrate with an organic silica thin film (uncured) having a thickness of about 250 nm. Next, a nanomold made of polyethylene terephthalate (manufactured by Soken Chemical & Engineering Co., Ltd. under the trade name of "FleFimo," nanopillar array, pitch 250 nm, pillar diameter 150 nm, pillar height 250 nm) was pressed against the surface of the organic silica thin film (uncured). With the nanomold pressed, heat treatment was performed at 80° C. for 4 hours, and then the nanomold was removed to obtain an organic silica thin film having a textured structure. Thereafter, the silicon substrate coated with the organic silica thin film having the textured structure was exposed to a vapor of 6 mol/L hydrochloric acid at 80° C. for 3 hours, allowing hydrolysis of residual alkoxy groups and curing of the thin film to proceed to form an organic silica thin film having a textured structure (hydrophilic thin film: porous organic silica thin film) on the silicon substrate.

[Evaluation of Characteristics of Organic Silica Thin Film Having Textured Structure Formed in Example 2]

<Microscopic Measurement of Organic Silica Thin Film Having Textured Structure>

In the production of the organic silica thin film (porous organic silica thin film) having the above-described textured structure, the surface shape of the organic silica thin film having a textured structure after removing the nanomold (thin film before exposure to the vapor of 6 mol/L hydrochloric acid) was measured with a scanning electron microscope (SEM) and an atomic force microscope (AFM). Note that the scanning electron microscope (SEM) used was a scanning electron microscope manufactured by Hitachi High-Technologies Corporation (under the trade name of "SU3500"), and in addition, the atomic force microscope used was a scanning probe microscope (SPM/AFM: manufactured by Hitachi High-Tech Science Corporation under the trade name of "NanoNavi E-sweep") as a measuring apparatus.

Figure 13:
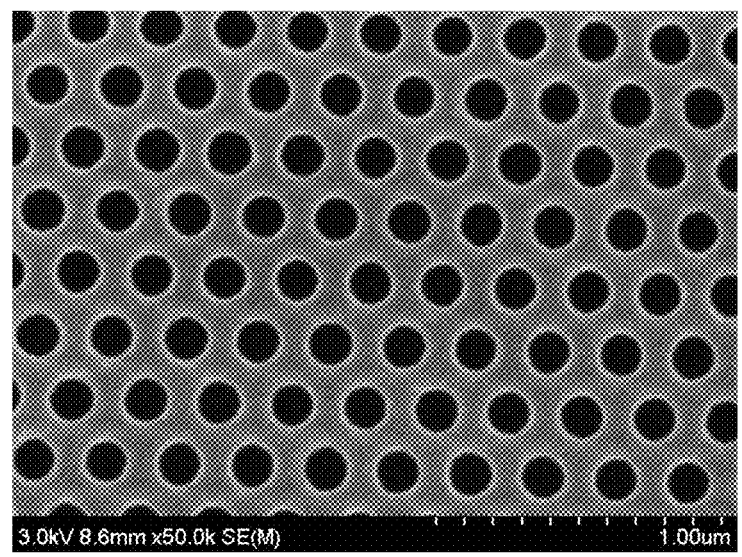
FIG. 13 is a scanning electron microscope (SEM) photograph of the surface of the organic silica thin film having a textured structure prepared in Example 2.

As a result of such measurement, FIG. 13 illustrates a scanning electron microscope (SEM) photograph of the surface of the organic silica thin film. As is apparent from the SEM image illustrated in FIG. 13, it was revealed that there formed was a regular porous structure (pore structure) on which the structure of the nanomold had been transcribed.

In addition, in the measurement with an atomic force microscope (AFM), measurement was carried out on multiple sites while changing the measurement sites, and a cross-sectional view (vertical cross-sectional view) was obtained at each measurement site. Then, the cross-sectional views obtained by such AFM measurement were used to measure the axis directions of 100 randomly selected textured structures (directions of the longitudinal axes of the pores). It was revealed that all of the axis directions of the textured structures measured were at angles in a range of 90°±20° with respect to the surface opposite to the surface of the organic silica thin film having the textured structure formed therein and that the axis directions of the textured structure were oriented substantially perpendicularly to the surface opposite to the surface of the organic silica thin film having the textured structure formed therein. In addition, the cross-sectional views obtained by such AFM measurement were used to measure the inter-wall distance (horizontal distance) between a bump part and the nearest bump part at a position with a height half the average height to be described later for 100 randomly selected bump parts, to measure the average thereof, and to measure the average value of the distance between bump part walls (average pore diameter of the pores), and it was revealed that the average value of the distance between bump part walls of the textured structure of the organic silica thin film (average pore diameter of the pores) was 150 nm. In addition, the cross-sectional views obtained by AFM measurement of the organic silica thin film were used to obtain the average bump part height (average pore (dent part) depth) for 100 randomly selected textured structures, and it was revealed that the average value of the height (dent part depth) of the bump part was 200 nm.

<Measurement of Water Contact Angle of Organic Silica Thin Film Having Textured Structure>

The water contact angle of the organic silica thin film having a textured structure obtained as described above (average value for five arbitrary measurement points) was measured by employing the same method as that of the "Measurement of Water Contact Angle of Organic Silica Thin Film" employed in evaluating the characteristics of the organic silica thin film obtained in step (I).

Figure 14:
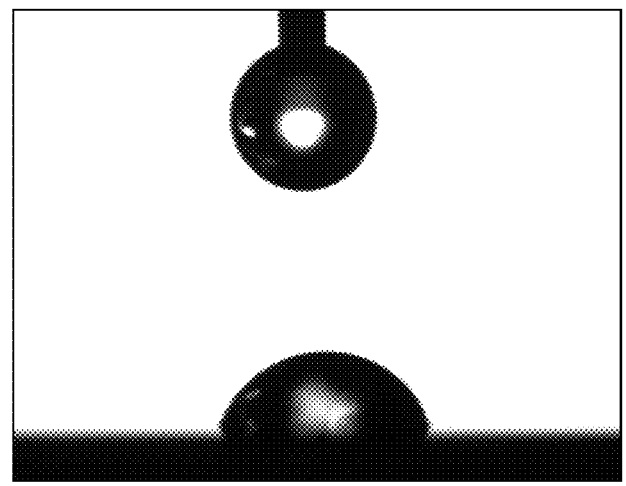
FIG. 14 is a photograph of a thin film illustrating a situation in which a water droplet at the time of measurement of the contact angle is in contact with the surface of the organic silica thin film having a textured structure formed in Example 1.

FIG. 14 illustrates a photograph of the thin film in contact with a water droplet at the time of measurement of the contact angle. Note that, the measurement revealed that the water contact angle of the organic silica thin film having a textured structure was 72°. From these results (FIG. 14, the size of the contact angle, and the like), it was found that the organic silica thin film having a textured structure was a hydrophilic thin film.

[Evaluation of Characteristics of Thin Film of Surface-Hydrophobized Silica Nanoparticles (A) Formed in Example 2]

<Measurement of Water Contact Angle of Thin Film Composed of Particles (A)>

The water contact angle of the thin film composed of the surface-hydrophobized silica nanoparticles (A) was measured as the average value for five arbitrary measurement points in the same manner as that of the method employed in "Measurement of Water Contact Angle of Organic Silica Thin Film" described above except that the measurement target was changed from the organic silica thin film obtained in step (I) to the thin film composed of the surface-hydrophobized silica nanoparticles (A) formed in Example 2. The results of the measurement revealed that the water contact angle of the thin film composed of the surface-hydrophobized silica nanoparticles (A) formed in Example 2 was 150° or more. As described above, it was found that the thin film composed of the surface-hydrophobized silica nanoparticles (A) formed in Example 2 was also a thin film exhibiting high water-repellency (super water repellency).

[Evaluation of Characteristics of Sample Plate Obtained in Example 2]

The same mass spectrometry as the "laser desorption/ionization mass spectrometry (LDI-MS)" performed in "Evaluation of Characteristics of Sample Plate Obtained in Example 1" was performed except that the sample plate obtained in Example 2 was used instead of the sample plate obtained in Example 1 as a substrate for analysis used in laser desorption/ionization mass spectrometry and that the amount of the aqueous solution of angiotensin I added dropwise (concentration of angiotensin I: 1 pmol/μL) was changed from 1.5 μL to 1.0 μL.

Figure 15:
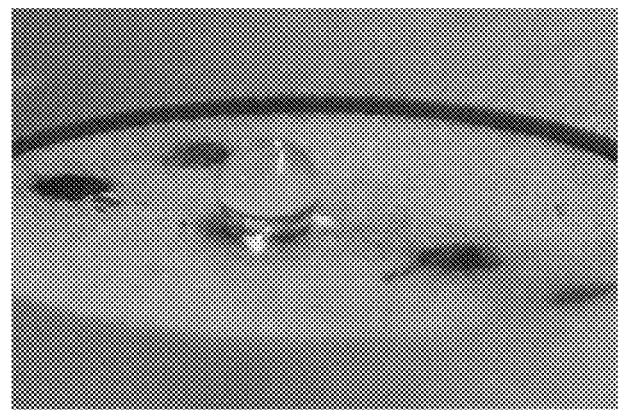
FIG. 15 is a photograph of a thin film illustrating a situation on the surface of a sample plate (thin film) when an aqueous solution of angiotensin I is coated on the sample plate obtained in Example 2.

FIG. 15 presents a photograph of the situation (fine hydrophilic/hydrophobic (water-repellent) pattern) on the surface of the sample plate (thin film) when the aqueous solution of angiotensin I was coated on the sample plate in the above mass spectrometry. From the photograph illustrated in FIG. 15, after coating with the aqueous solution of angiotensin I, it was revealed that the aqueous solution of angiotensin I remained on the sample spot of the sample plate (thin film) and that no exudation and the like from the sample spot occurred, and it was found that only the exposed portion of the organic silica thin film (sample spot) was selectively coated with the sample solution.

Figure 16:
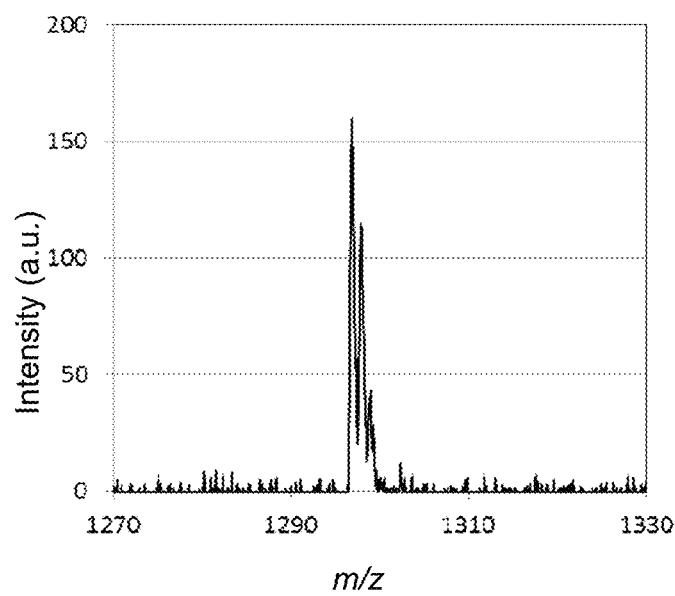
FIG. 16 is a graph of a mass spectrum (LDI-MS spectrum) obtained as a result of mass spectrometry using the sample plate obtained in Example 2.

FIG. 16 illustrates a graph of the LDI-MS spectrum of one measurement point as a result of the mass spectrometry. As is apparent from the analysis result illustrated in FIG. 16 (graph of the LDI-MS spectrum), it has been found from the above-described mass spectrometry that the signal derived from angiotensin I (m/Z=1297) is clearly confirmed. Also in the LDI-MS spectra of the remaining four measurement points, a signal derived from angiotensin I having almost the same intensity as the spectrum illustrated in FIG. 16 was confirmed. From the above results, it has been found that, when the sample plate obtained in Example 2 is used as a substrate for analysis used in laser desorption/ionization mass spectrometry, it is possible to reproducibly perform accurate mass spectrometry in which a signal of the sample can be clearly confirmed.

Example 3

First, the same step as the "Step of Preparing Organic Silica Thin Film Having Textured Structure" employed in Example 2 was employed to prepare an organic silica thin film (hydrophilic thin film: porous organic silica thin film) having a textured structure, where the pores (dent parts) had an average pore diameter of 150 nm and the bump parts had an average height value (depth of dent parts) of 200 nm. Then, a sample plate for laser desorption/ionization mass spectrometry was prepared by partially stacking a thin film composed of the surface-hydrophobized silica nanoparticles (B) on the surface of the organic silica thin film (porous organic silica thin film) having a textured structure through the same step as step (II) employed in Example 1 except that the organic silica thin film having a textured structure was used instead of the organic silica thin film obtained in the step (I) and that the dispersion liquid of the particles (B) prepared in Preparation Example 3 (ethanol dispersion liquid of the surface-hydrophobized silica nanoparticles (B) having an average particle diameter of about 200 nm) was used instead of the dispersion liquid of the particles (A) prepared in Preparation Example 2.

[Evaluation of Characteristics of Thin Film of Surface-Hydrophobized Silica Nanoparticles (B) Formed in Example 3]

<Scanning Electron Microscope (SEM) Measurement of Thin Film Composed of Particles (B)>

Figure 17:
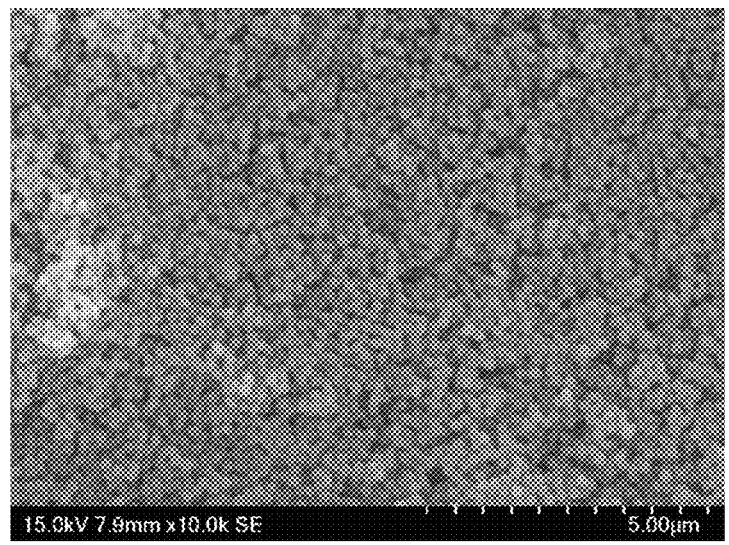
FIG. 17 is a scanning electron microscope (SEM) photograph illustrating the surface condition of the thin film composed of the surface-hydrophobized silica nanoparticles (B) prepared in Example 3.

The thin film composed of the surface-hydrophobized silica nanoparticles (B) formed in Example 3 was subjected to SEM measurement in the same manner as that of the method employed in the above-described "Scanning Electron Microscope (SEM) Measurement of Thin Film Composed of Particles (A)." FIG. 17 presents, as the result of the measurement, a scanning electron microscope (SEM) photograph illustrating the surface condition of the thin film composed of the surface-hydrophobized silica nanoparticles (B). From the SEM image illustrated in FIG. 17, it was found that the thin film of surface-hydrophobized silica nanoparticles (B) was one formed by multi-stacking of the surface-hydrophobized silica nanoparticles (B). Note that, from the SEM measurement, it was also found that the thickness of the thin film composed of the particles (B) was 2 to 3 μm.

<Measurement of Water Contact Angle of Thin Film Composed of Particles (B)>

Figure 18:
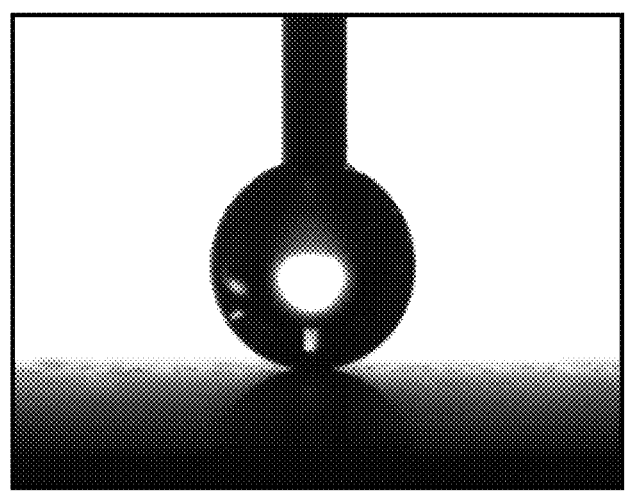
FIG. 18 is a photograph of a thin film illustrating a situation in which a water droplet at the time of measurement of the contact angle is in contact with the surface of the thin film composed of the surface-hydrophobized silica nanoparticles (B) prepared in Example 3.

The water contact angle of the thin film composed of the surface-hydrophobized silica nanoparticles (B) was measured as the average value for five arbitrary measurement points in the same manner as that of the method employed in "Measurement of Water Contact Angle of Organic Silica Thin Film" described above except that the measurement target was changed from the organic silica thin film obtained in step (I) to the thin film composed of the surface-hydrophobized silica nanoparticles (B) formed in Example 3. FIG. 18 illustrates a photograph of the thin film in contact with a water droplet at the time of measurement of the contact angle. Note that the measurement revealed that the water contact angle of the thin film composed of the surface-hydrophobized silica nanoparticles (B) was 150° or more. From these results (FIG. 18, the size of the contact angle, and the like), it was found that the thin film composed of the surface-hydrophobized silica nanoparticles (B) was a thin film exhibiting high water-repellency (super water repellency).

[Evaluation of Characteristics of Sample Plate Obtained in Example 3]

The same mass spectrometry as the "laser desorption/ionization mass spectrometry (LDI-MS)" performed in "Evaluation of Characteristics of Sample Plate Obtained in Example 1" was performed except that the sample plate obtained in Example 3 was used instead of the sample plate obtained in Example 1 as a substrate for analysis used in laser desorption/ionization mass spectrometry and that the amount of the aqueous solution of angiotensin I added dropwise (concentration of angiotensin I: 1 pmol/μL) was changed from 1.5 μL to 1.0 μL. Here, the surface condition of the sample plate was observed when the aqueous solution of angiotensin I was coated on the sample plate. Then, it was revealed that the aqueous solution of angiotensin I remained on the sample spot of the sample plate and no exudation and the like from the sample spot occurred, and it was revealed that, as in Examples 1 and 2, only the exposed portion of the organic silica thin film (sample spot) was selectively coated with the sample solution.

Figure 19:
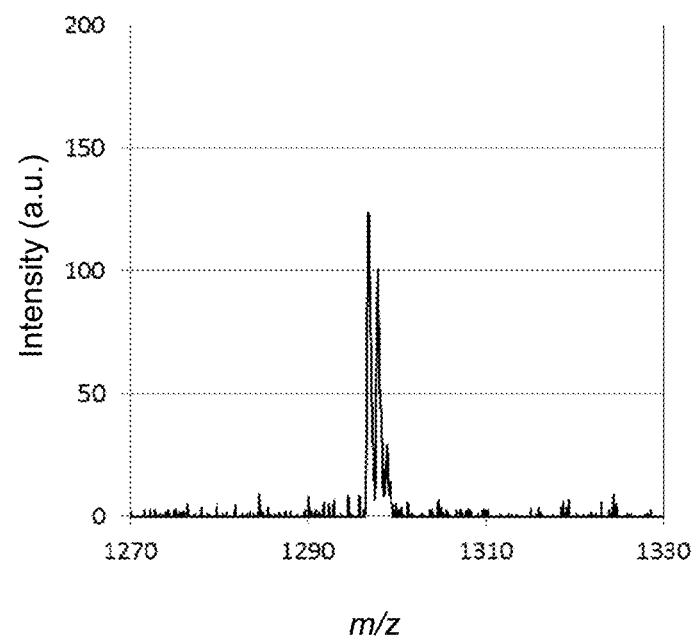
FIG. 19 is a graph of a mass spectrum (LDI-MS spectrum) obtained as a result of mass spectrometry using the sample plate obtained in Example 3.

FIG. 19 illustrates a graph of the LDI-MS spectrum of one measurement point as a result of the mass spectrometry. As is apparent from the analysis result illustrated in FIG. 19 (graph of the LDI-MS spectrum), it has been found from the above-described mass spectrometry that the signal derived from angiotensin I (m/Z=1297) is clearly confirmed. Also in the LDI-MS spectra of the remaining four measurement points, a signal derived from angiotensin I having almost the same intensity as the spectrum illustrated in FIG. 19 was confirmed. From the above results, it has been found that, when the sample plate obtained in Example 3 is used as a substrate for analysis used in laser desorption/ionization mass spectrometry, it is possible to reproducibly perform accurate mass spectrometry in which a signal of the sample can be clearly confirmed.

Example 4

First, the same step as the "Step of Preparing Organic Silica Thin Film Having Textured Structure" employed in Example 2 was employed to prepare an organic silica thin film (hydrophilic thin film: porous organic silica thin film) having a textured structure, where the pores (dent parts) had an average pore diameter of 150 nm and the bump parts had an average height value (depth of dent parts) of 200 nm. Then, a sample plate for laser desorption/ionization mass spectrometry was prepared by partially stacking a thin film composed of the surface-hydrophobized porous silica nanoparticles (C) on the surface of the organic silica thin film (porous organic silica thin film) having a textured structure through the same step as step (II) employed in Example 1 except that the organic silica thin film having a textured structure was used instead of the organic silica thin film obtained in the step (I) and that the dispersion liquid of the particles (C) prepared in Preparation Example 4 (dispersion liquid of the surface-hydrophobized porous silica nanoparticles (C) having an average particle diameter of 150 nm) was used instead of the dispersion liquid of the particles (A) prepared in Preparation Example 2.

[Evaluation of Characteristics of Thin Film of Surface-Hydrophobized Porous Silica Nanoparticles (C) Formed in Example 4]

<Scanning Electron Microscope (SEM) Measurement of Thin Film Composed of Particles (C)>

Figure 20:
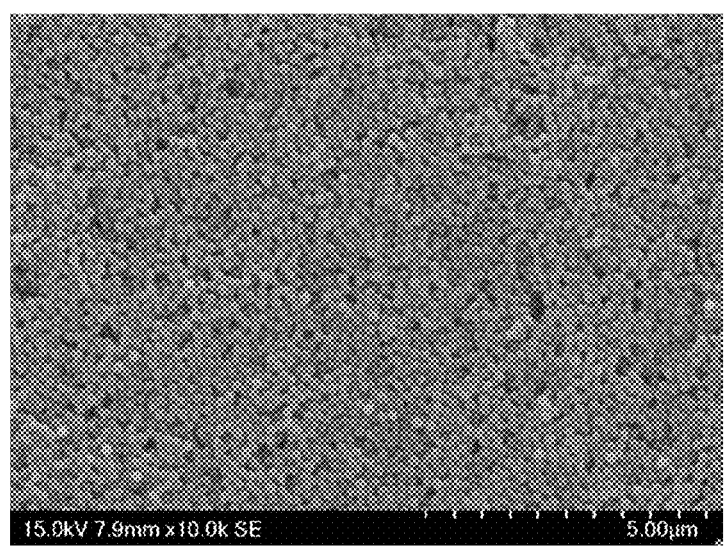
FIG. 20 is a scanning electron microscope (SEM) photograph illustrating the surface condition of the thin film composed of the surface-hydrophobized porous silica nanoparticles (C) prepared in Example 4.

The thin film composed of the surface-hydrophobized porous silica nanoparticles (C) formed in Example 4 was subjected to SEM measurement in the same manner as that of the method employed in the above-described "Scanning Electron Microscope (SEM) Measurement of Thin Film Composed of Particles (A)." FIG. 20 presents, as the result of the measurement, a scanning electron microscope (SEM) photograph illustrating the surface condition of the thin film composed of the surface-hydrophobized porous silica nanoparticles (C). As is apparent from the SEM image illustrated in FIG. 20, it was found that the thin film of surface-hydrophobized porous silica nanoparticles (C) was one formed by multi-stacking of the surface-hydrophobized porous silica nanoparticles (C). Note that, from the SEM measurement, it was also found that the thickness of the thin film composed of the particles (C) was 2 to 3 μm.

<Measurement of Water Contact Angle of Thin Film Composed of Particles (C)>

Figure 21:
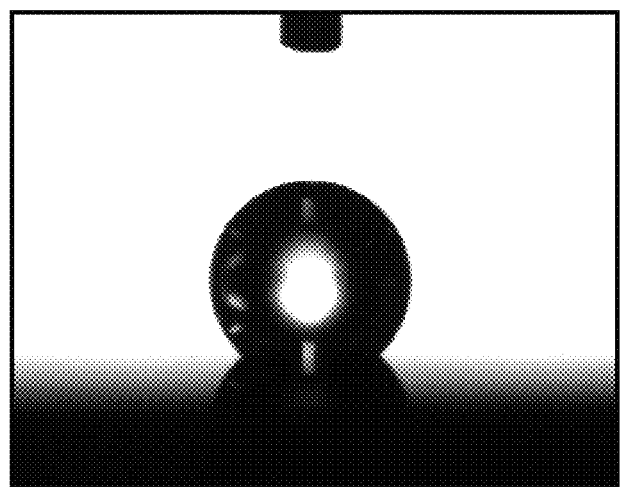
FIG. 21 is a photograph of a thin film illustrating a situation in which a water droplet at the time of measurement of the contact angle is in contact with the surface of the thin film composed of the surface-hydrophobized porous silica nanoparticles (C) prepared in Example 4.

The water contact angle of the thin film composed of the surface-hydrophobized porous silica nanoparticles (C) was measured as the average value for five arbitrary measurement points in the same manner as that of the method employed in "Measurement of Water Contact Angle of Organic Silica Thin Film" described above except that the measurement target was changed from the organic silica thin film obtained in step (I) to the thin film composed of the surface-hydrophobized porous silica nanoparticles (C) formed in Example 4. FIG. 21 illustrates a photograph of the thin film in contact with a water droplet at the time of measurement of the contact angle. Note that the measurement revealed that the water contact angle of the thin film composed of the surface-hydrophobized porous silica nanoparticles (C) was 132°. From these results (FIG. 21, the size of the contact angle, and the like), it was found that the thin film composed of the surface-hydrophobized porous silica nanoparticles (C) was a thin film exhibiting sufficiently high water-repellency.

[Evaluation of Characteristics of Sample Plate Obtained in Example 4]

The same mass spectrometry as the "laser desorption/ionization mass spectrometry (LDI-MS)" performed in "Evaluation of Characteristics of Sample Plate Obtained in Example 1" was performed except that the sample plate obtained in Example 4 was used instead of the sample plate obtained in Example 1 as a substrate for analysis used in laser desorption/ionization mass spectrometry and that the amount of the aqueous solution of angiotensin I added dropwise (concentration of angiotensin I: 1 pmol/μL) was changed from 1.5 μL to 1.0 μL. Here, the surface condition of the sample plate was observed when the aqueous solution of angiotensin I was coated on the sample plate. Then, it was revealed that the aqueous solution of angiotensin I remained on the sample spot of the sample plate and no exudation and the like from the sample spot occurred, and it was revealed that, as in Examples 1 and 2, only the exposed portion of the organic silica thin film (sample spot) was selectively coated with the sample solution.

Figure 22:
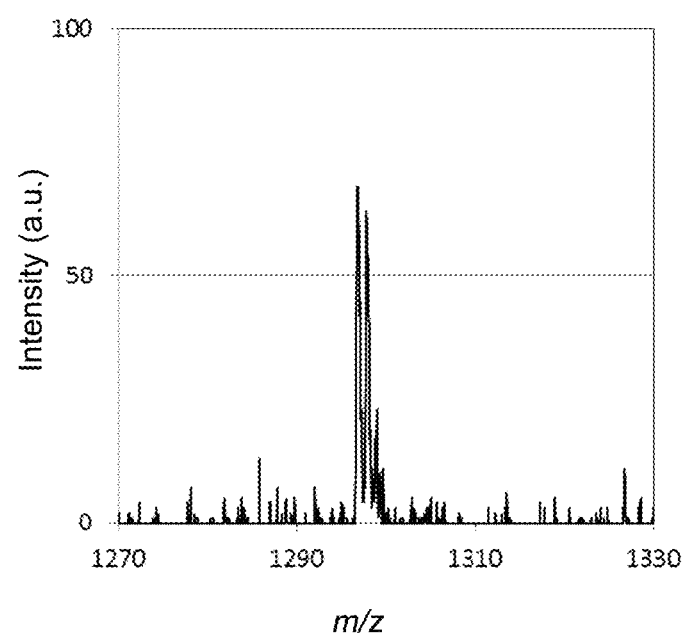
FIG. 22 is a graph of a mass spectrum (LDI-MS spectrum) obtained as a result of mass spectrometry using the sample plate obtained in Example 4.

FIG. 22 illustrates a graph of the LDI-MS spectrum of one measurement point as a result of the mass spectrometry. As is apparent from the analysis result illustrated in FIG. 22 (graph of the LDI-MS spectrum), it has been found from the above-described mass spectrometry that the signal derived from angiotensin I (m/Z=1297) is clearly confirmed. Also in the LDI-MS spectra of the remaining four measurement points, a signal derived from angiotensin I having almost the same intensity as the spectrum illustrated in FIG. 22 was confirmed. From the above results, it has been found that, when the sample plate obtained in Example 4 is used as a substrate for analysis used in laser desorption/ionization mass spectrometry, it is possible to reproducibly perform accurate mass spectrometry in which a signal of the sample can be clearly confirmed.

Comparative Example 1

The same step as step (I) employed in Example 1 was used to form an organic silica thin film (hydrophilic thin film) on a silicon substrate, which was directly used as a comparative sample plate for laser desorption/ionization mass spectrometry. Thus, in Comparative Example 1, a water-repellent thin film was not formed on the organic silica thin film (hydrophilic thin film).

[Evaluation of Characteristics of Sample Plate Obtained in Comparative Example 1]

Mass spectrometry in the same conditions as those of the "laser desorption/ionization mass spectrometry (LDI-MS)" performed in "Evaluation of Characteristics of Sample Plate Obtained in Example 1" was performed except that the sample plate obtained in Comparative Example 1 was used instead of the sample plate obtained in Example 1 as a substrate for analysis used in laser desorption/ionization mass spectrometry. Note that, since the sample plate obtained in Comparative Example 1 did not particularly have a region to be a sample spot formed thereon (a water-repellent thin film was not formed on the periphery of the sample spot), an aqueous solution of angiotensin I (concentration of angiotensin I: 1 pmol/μL) was added dropwise to an arbitrary site on the sample plate, and arbitrary five measurement points in the dropping position (five different circular regions with a diameter of 50 μm in the dropping region where the aqueous solution of angiotensin I was added dropwise) were each irradiated with a laser ray.

Figure 23:
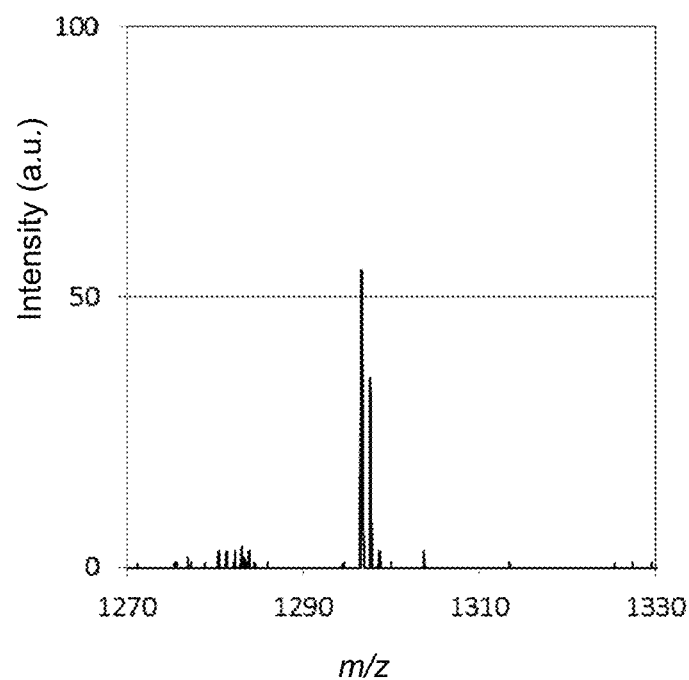
FIG. 23 is a graph of a mass spectrum (LDI-MS spectrum) obtained as a result of mass spectrometry using the sample plate obtained in Comparative Example 1.

FIG. 23 illustrates a graph of the LDI-MS spectrum of one measurement point as a result of the mass spectrometry. As is apparent from the analysis result illustrated in FIG. 23 (graph of the LDI-MS spectrum), it has been found also in the above-described mass spectrometry that the signal derived from angiotensin I (m/Z=1297) is confirmed. Also in the LDI-MS spectra of the remaining four measurement points, a signal derived from angiotensin I having almost the same intensity as the spectrum illustrated in FIG. 23 was confirmed.

Figure 24:
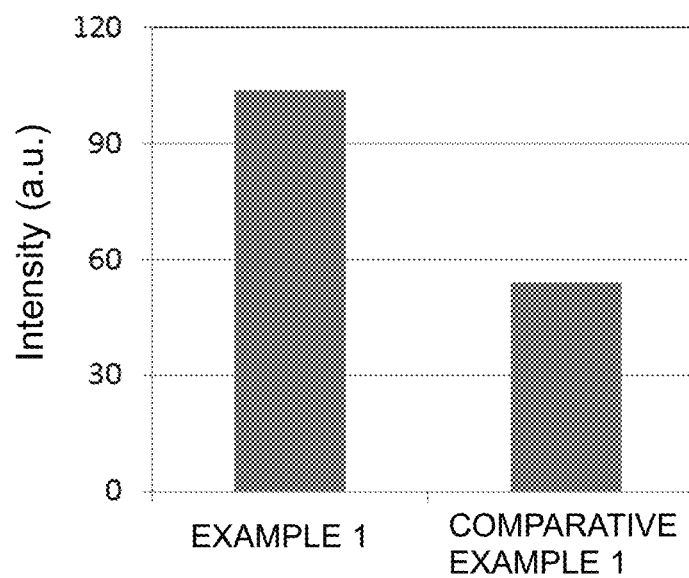
FIG. 24 is a graph illustrating a relationship between the intensities of the signals derived from angiotensin I (m/Z=1297) confirmed in the LDI-MS spectrum illustrated in FIG. 12 and the LDI-MS spectrum illustrated in FIG. 23.

Note that, in laser desorption/ionization mass spectrometry using the sample plate obtained in Example 1 described above and in laser desorption/ionization mass spectrometry using the sample plate obtained in Comparative Example 1, the amount used of the aqueous solution of angiotensin I, the sample solution, was the same, and the conditions at the time of mass spectrometry were the same. In view of the above, the intensity of the signal (m/Z=1297) derived from angiotensin I was compared between the LDI-MS spectrum illustrated in FIG. 12 (Example 1) and the LDI-MS spectrum illustrated in FIG. 23 (Comparative Example 1). FIG. 24 presents a graph illustrating such an intensity relationship.

As apparent from the results illustrated in FIG. 24, it was revealed that, in the case of using the sample plate obtained in Comparative Example 1, the signal intensity measured in mass spectrometry decreased by 48% as compared with the sample plate obtained in Example 1. The present inventors speculate from the results as follows. In the sample plate obtained in Example 1, a thin film composed of surface-hydrophobized silica nanoparticles (A) (thin film of surface-hydrophobized silica nanoparticles (A)) was formed in a region other than a region to be a sample spot. For this reason, an effect of concentrating the sample (angiotensin I) was sufficiently obtained in the sample spot, making it possible to confirm a higher signal intensity. In addition, it has been found from the results that, in the case of using the sample plate (Example 1) having a thin film composed of surface-hydrophobized nanoparticles formed in a region other than a region to be a sample spot on the surface of a hydrophilic thin film capable of absorbing a laser ray, more accurate mass spectrometry can be performed as compared with the case of using the sample plate obtained in Comparative Example 1.

As has been described above, the present invention makes it possible to provide a sample plate for laser desorption/ionization mass spectrometry which provides an option not to use a matrix compound in mass spectrometry, which is capable of selectively supporting the sample on a sample spot, and which enables accurate analysis with good reproducibility that makes it possible to clearly confirm a signal of the sample in laser desorption/ionization mass spectrometry. Such a sample plate for laser desorption/ionization mass spectrometry of the present invention is useful as e.g. an analysis substrate used in laser desorption/ionization (LDI).

What is claimed is:

1. A sample plate for laser desorption/ionization mass spectrometry, comprising:
   a hydrophilic thin film capable of absorbing a laser ray; and
   a water-repellent thin film comprising surface-hydrophobized nanoparticles having a structure in which a plurality of the nanoparticles are stacked on each other in a thickness direction of the water-repellent thin film, and the water-repellent thin film being located in a region other than a region to be a sample spot on a surface of the hydrophilic thin film, wherein
   a water contact angle of the water-repellent thin film is 120° or more.

2. The sample plate for laser desorption/ionization mass spectrometry according to claim 1, wherein
   the hydrophilic thin film is an organic silica thin film which is composed of organic silica having an organic group capable of absorbing a laser ray in a skeleton.

3. The sample plate for laser desorption/ionization mass spectrometry according to claim 2, wherein
   the organic silica thin film is a porous film having a textured structure in which dent parts are formed of column-shaped pores.

4. The sample plate for laser desorption/ionization mass spectrometry according to claim 1, wherein
   the water contact angle of the water-repellent thin film is 130° or more.

5. The sample plate for laser desorption/ionization mass spectrometry according to claim 1, wherein the water contact angle of the water-repellent thin film is 150° or more.

6. The sample plate for laser desorption/ionization mass spectrometry according to claim 2, wherein
the organic group capable of absorbing a laser ray is an organic group having an absorption local maximum wavelength in a wavelength range of 200 to 600 nm.

7. The sample plate for laser desorption/ionization mass spectrometry according to claim 2, wherein
the organic group capable of absorbing a laser ray is at least one selected from the group consisting of triphenylamine optionally having a substituent, naphthalimide optionally having a substituent, pyrene optionally having a substituent, perylene optionally having a substituent, and acridone optionally having a substituent.

8. The sample plate for laser desorption/ionization mass spectrometry according to claim 2, wherein
the organic group capable of absorbing a laser ray is at least one selected from the group consisting of triphenylamine optionally having a substituent, and naphthalimide optionally having a substituent.

9. The sample plate for laser desorption/ionization mass spectrometry according to claim 1, wherein
an average particle diameter of the surface-hydrophobized nanoparticles is 50 to 500 nm.

10. The sample plate for laser desorption/ionization mass spectrometry according to claim 1, wherein
the surface-hydrophobized nanoparticles are surface-hydrophobized silica nanoparticles having hydrophobic groups introduced on their surface.

11. The sample plate for laser desorption/ionization mass spectrometry according to claim 10, wherein
the hydrophobic group is at least one selected from the group consisting of an alkyl group, a fluorinated alkyl group, an alkyl chloride group, and an alkyl bromide group.

12. The sample plate for laser desorption/ionization mass spectrometry according to claim 10, wherein
the hydrophobic group is a fluorinated alkyl group.

* * * * *